United States Patent
Degner et al.

(10) Patent No.: US 9,612,674 B2
(45) Date of Patent: Apr. 4, 2017

(54) MOVABLE TRACK PAD WITH ADDED FUNCTIONALITY

(71) Applicant: Apple Inc., Cupertino, CA (US)

(72) Inventors: Brett William Degner, Cupertino, CA (US); Patrick Kessler, San Francisco, CA (US); Christiaan A. Ligtenberg, Cupertino, CA (US); Thomas W. Wilson, Jr., Saratoga, CA (US); Bartley K. Andre, Cupertino, CA (US); Matthew P. Casebolt, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/660,800

(22) Filed: Mar. 17, 2015

(65) Prior Publication Data

US 2015/0193038 A1    Jul. 9, 2015

Related U.S. Application Data

(63) Continuation of application No. 13/864,193, filed on Apr. 16, 2013, now abandoned, which is a continuation of application No. 12/241,967, filed on Sep. 30, 2008, now Pat. No. 8,441,450.

(51) Int. Cl.
*G06F 3/041* (2006.01)
*H01H 25/04* (2006.01)
*G06F 3/0354* (2013.01)
*G06F 3/044* (2006.01)
(Continued)

(52) U.S. Cl.
CPC .............. *G06F 3/041* (2013.01); *G06F 1/169* (2013.01); *G06F 3/03547* (2013.01); *G06F 3/042* (2013.01); *G06F 3/044* (2013.01); *H01H 25/041* (2013.01); *G06F 2203/04105* (2013.01)

(58) Field of Classification Search
CPC ...... G06F 3/03547; G06F 3/041; G06F 3/038; G06F 3/0414; G06F 3/0338; G06F 2203/04105; G06F 1/1667; G06F 1/1671; G06F 3/0208; H01H 2003/0293; H01H 2025/048; H01H 2239/006; H01H 25/041;
(Continued)

(56) References Cited

U.S. PATENT DOCUMENTS

| 4,587,378 A | 5/1986 | Moore |
| 5,119,258 A | 6/1992 | Tsai et al. |
| 5,245,245 A | 9/1993 | Goldenberg |

(Continued)

FOREIGN PATENT DOCUMENTS

| GB | 2402105 | 12/2004 |
| JP | 09-251347 | 9/1997 |

(Continued)

*Primary Examiner* — Sanjiv D Patel
(74) *Attorney, Agent, or Firm* — Brownstein Hyatt Farber Schreck, LLP

(57) ABSTRACT

An input device is disclosed. The input device includes a movable touch-sensitive track pad capable of detecting an object in close proximity thereto so as to generate a tracking control signal. The input device also includes a movement indicator capable of detecting the movements of the movable track pad so as to generate one or more other control signals (e.g., button signals). The control signals can be used to perform actions in an electronic device operatively coupled to the input device.

23 Claims, 34 Drawing Sheets

(51) Int. Cl.
*G06F 3/042* (2006.01)
*G06F 1/16* (2006.01)

(58) Field of Classification Search
CPC .... H01H 13/02; H01H 13/7006; H01H 3/122; H03K 17/962; G09G 3/344
See application file for complete search history.

(56) References Cited

U.S. PATENT DOCUMENTS

| | | | |
|---|---|---|---|
| 5,977,867 A | 11/1999 | Blouin | |
| 5,977,888 A | 11/1999 | Fujita et al. | |
| 6,034,672 A * | 3/2000 | Gaultier | G06F 3/0488 345/157 |
| 6,243,080 B1 | 6/2001 | Molne | |
| 6,262,717 B1 | 7/2001 | Donohue et al. | |
| 6,271,830 B1 | 8/2001 | Berstis | |
| 6,281,887 B1 | 8/2001 | Wang | |
| 6,323,846 B1 * | 11/2001 | Westerman | G06F 3/0235 345/173 |
| 6,661,399 B1 | 12/2003 | Oh et al. | |
| 6,677,703 B2 | 1/2004 | Ito et al. | |
| 6,819,312 B2 * | 11/2004 | Fish | G06F 3/016 345/156 |
| 6,822,635 B2 | 11/2004 | Shahoian et al. | |
| 7,499,040 B2 * | 3/2009 | Zadesky | G06F 3/0338 345/173 |
| 7,850,378 B1 | 12/2010 | Ligtenberg et al. | |
| RE42,064 E * | 1/2011 | Fish | G06F 3/016 345/156 |
| 7,934,292 B2 | 5/2011 | Degner et al. | |
| 8,441,450 B2 | 5/2013 | Degner et al. | |
| 8,816,978 B2 * | 8/2014 | Hirano | G06F 1/169 345/173 |
| 2003/0030627 A1 | 2/2003 | Yanagisawa | |
| 2004/0012915 A1 | 1/2004 | Hsu | |
| 2004/0027339 A1 | 2/2004 | Schulz | |
| 2005/0052425 A1 | 3/2005 | Zadesky et al. | |
| 2006/0007167 A1 | 1/2006 | Shih | |
| 2006/0181515 A1 | 8/2006 | Fletcher et al. | |
| 2006/0250377 A1 * | 11/2006 | Zadesky | G06F 1/1613 345/173 |
| 2007/0052691 A1 | 3/2007 | Zadesky et al. | |
| 2007/0091076 A1 | 4/2007 | Schulz | |
| 2007/0229467 A1 | 10/2007 | Sakai et al. | |
| 2007/0236450 A1 | 10/2007 | Colgate et al. | |
| 2007/0273671 A1 * | 11/2007 | Zadesky | G06F 3/0338 345/173 |
| 2008/0024427 A1 * | 1/2008 | Kuo | G02F 1/136204 345/107 |
| 2008/0087476 A1 * | 4/2008 | Prest | G06F 3/0338 178/18.01 |
| 2008/0202824 A1 | 8/2008 | Philipp et al. | |
| 2008/0246739 A1 * | 10/2008 | Choi | G02F 1/167 345/173 |
| 2009/0135145 A1 * | 5/2009 | Chen | G06F 3/016 345/173 |
| 2010/0173689 A1 | 7/2010 | Ansari et al. | |
| 2013/0285984 A1 | 10/2013 | Degner et al. | |

FOREIGN PATENT DOCUMENTS

| | | |
|---|---|---|
| JP | 2000-200141 | 7/2000 |
| JP | 2008117212 | 5/2008 |
| JP | 2008532115 | 8/2008 |
| WO | WO 01/31429 | 5/2001 |
| WO | WO 2009/088672 | 7/2009 |

* cited by examiner

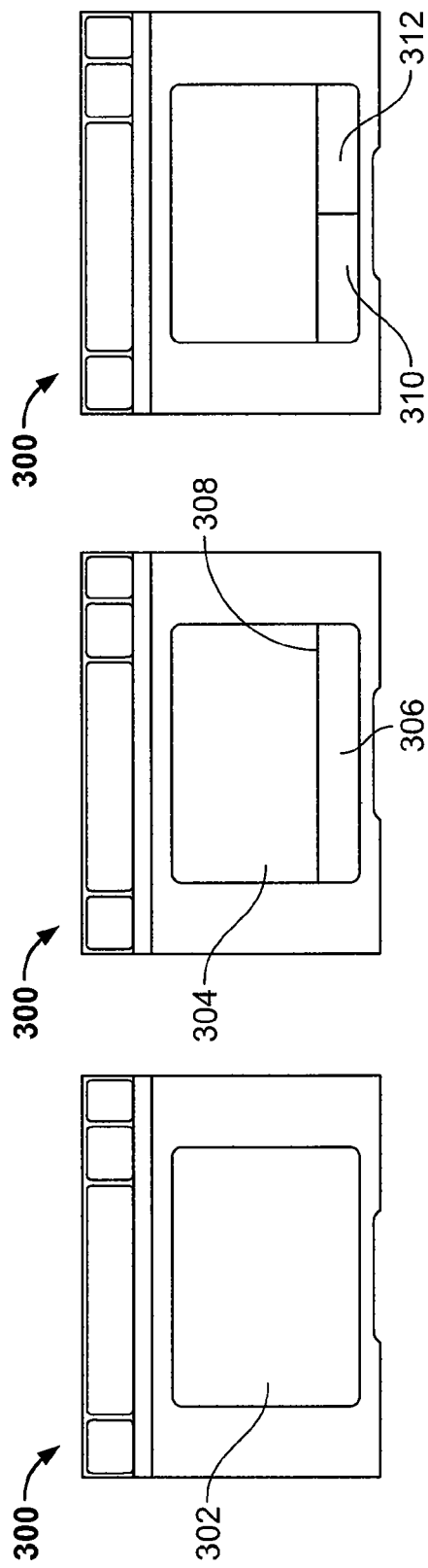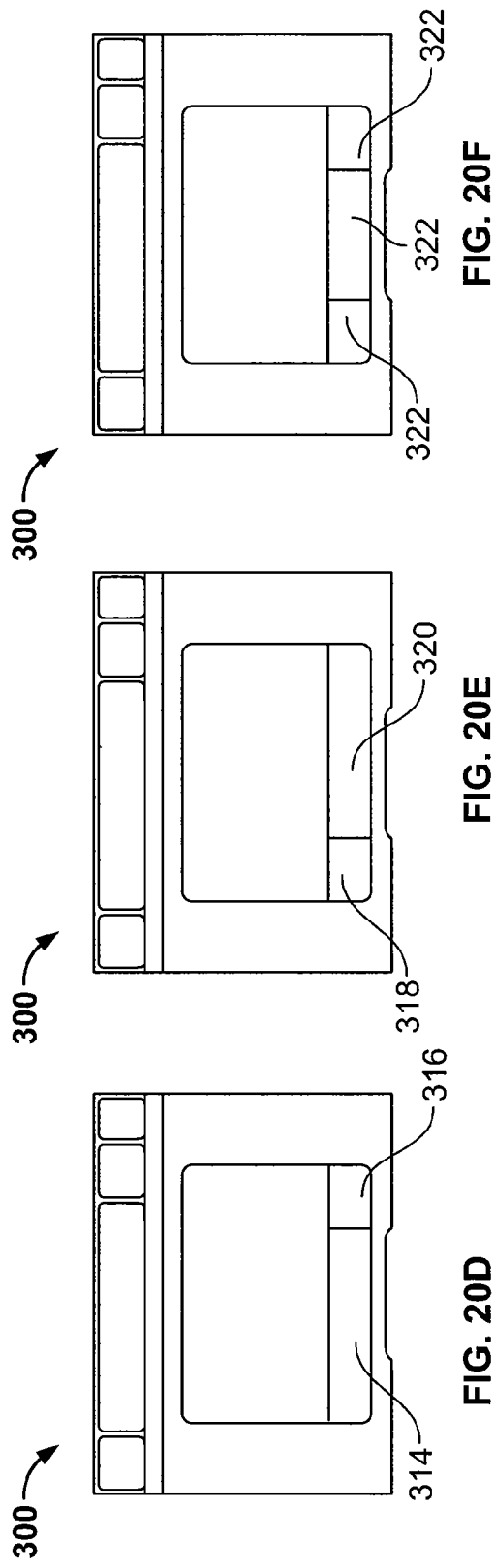

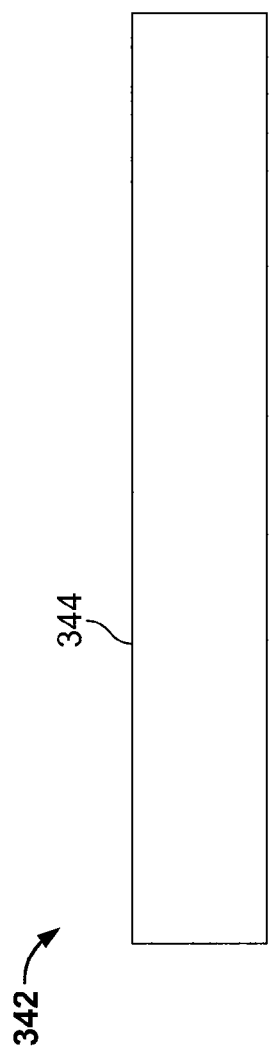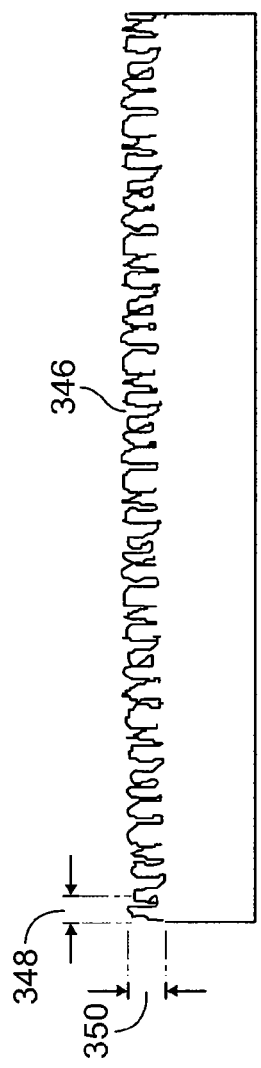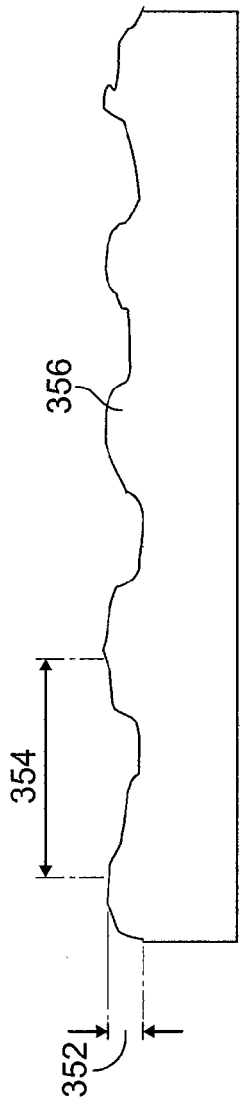

MOVABLE TRACK PAD WITH ADDED FUNCTIONALITY

CROSS REFERENCE TO RELATED APPLICATIONS

This U.S. patent application is a continuation of co-pending U.S. application Ser. No. 13/864,193 filed Apr. 16, 2013 and entitled "MOVABLE TRACK PAD WITH SMUDGE-RESISTANT INPUT SURFACE" which is a continuation of co-pending U.S. application Ser. No. 12/241,967 filed Sep. 30, 2008 and entitled "MOVABLE TRACK PAD WITH ADDED FUNCTIONALITY" both of which are incorporated by reference in their entirety as if fully disclosed herein.

BACKGROUND OF THE INVENTION

1. Field of the Invention

The present invention relates generally to track pads. More particularly, the present invention relates to track pads capable of relative movement in order to increase the functionality of the track pad.

2. Background Art

There exist today many styles of input devices for performing operations in a consumer electronic device. The operations generally correspond to moving a cursor and making selections on a display screen. By way of example, the input devices may include buttons, switches, keyboards, mice, trackballs, touch pads, joy sticks, touch screens and the like. Each of these devices has advantages and disadvantages that are taken into account when designing the consumer electronic device. In handheld computing devices, the input devices are generally selected from buttons and switches. Buttons and switches are generally mechanical in nature and provide limited control with regards to the movement of a cursor (or other selector) and making selections. For example, they are generally dedicated to moving the cursor in a specific direction (e.g., arrow keys) or to making specific selections (e.g., enter, delete, number, etc.). In the case of hand-held personal digital assistants (PDA), the input devices tend to utilize touch-sensitive display screens. When using a touch screen, a user makes a selection on the display screen by pointing directly to objects on the screen using a stylus or finger.

In portable computing devices such as laptop computers, the input devices are commonly track pads (also known as touch pads). With a track pad, the movement of an input pointer (i.e., cursor) corresponds to the relative movements of the user's finger (or stylus) as the finger is moved along a surface of the track pad. Track pads can also make a selection on the display screen when one or more taps are detected on the surface of the track pad. In some cases, any portion of the track pad may be tapped, and in other cases a dedicated portion of the track pad may be tapped. In stationary devices such as desktop computers, the input devices are generally selected from mice and trackballs. With a mouse, the movement of the input pointer corresponds to the relative movements of the mouse as the user moves the mouse along a surface. With a trackball, the movement of the input pointer corresponds to the relative movements of a ball as the user rotates the ball within a housing. Both mice and trackballs generally include one or more buttons for making selections on the display screen.

In addition to allowing input pointer movements and selections with respect to a graphical user interface, or GUI, presented on a display screen, the input devices may also allow a user to scroll across the display screen in the horizontal or vertical directions. For example, mice may include a scroll wheel that allows a user to simply roll the scroll wheel forward or backward to perform a scroll action. In addition, track pads may provide dedicated active areas that implement scrolling when the user passes his or her finger linearly across the active area in the x and y directions. Both devices may also implement scrolling via horizontal and vertical scroll bars as part of the GUI. Using this technique, scrolling is implemented by positioning the input pointer over the desired scroll bar, selecting the desired scroll bar, and moving the scroll bar by moving the mouse or finger in the y direction (forwards and backwards) for vertical scrolling or in the x direction (left and right) for horizontal scrolling.

BRIEF SUMMARY OF THE INVENTION

The present invention relates generally to a track pad capable of detecting an object in close proximity thereto. More particularly, the present invention relates to a track pad capable of moving in order to increase the functionality of the track pad. For example, the track pad may be depressible so as to provide additional button functionality.

The invention relates in one embodiment to an input device having a track pad and a track surface. A flexure hinge is operatively connected at one end of the track pad and is configured to allow displacement of the track pad from a neutral position to an activate position when a force is applied to substantially any portion of the track surface, while at the same time urging the track pad towards the neutral position from the activate position. The track pad generates a first control signal when the track pad is at the activate position and the track pad generates a second control signal when an object is moved relative to the track surface.

The invention relates in another embodiment to a computing system having a computing device capable of receiving, processing and outputting data and an input device configured to send data to the computing device in order to perform an action in the computing device. The input device has a depressible touch-sensitive track pad coupled to the computing device by a flexure hinge and is configured to generate tracking signals, and a movement indicator configured to generate a button signal when the track pad is depressed.

The invention relates in another embodiment to an input device having a capacitive touch sensitive track pad with an etched glass track surface. A flexure hinge is operatively connected at one end of the track pad and is configured to allow displacement of the track pad from a neutral position to an activate position when a force is applied to substantially any portion of the track surface, while at the same time urging the track pad towards the neutral position from the activate position. The track pad generates a button signal when the track pad is in the activate position and the track pad generates a tracking signal when an object is moved relative to the track surface.

BRIEF DESCRIPTION OF THE DRAWINGS/FIGURES

The present invention is illustrated by way of example, and not by way of limitation, in the figures of the accompanying drawings and in which like reference numerals refer to similar elements and in which.

FIGS. 3A,3B,3C, and 3D are simplified side views of an input device having a button touch pad, in accordance with one embodiment of the present invention.

Figure 4:
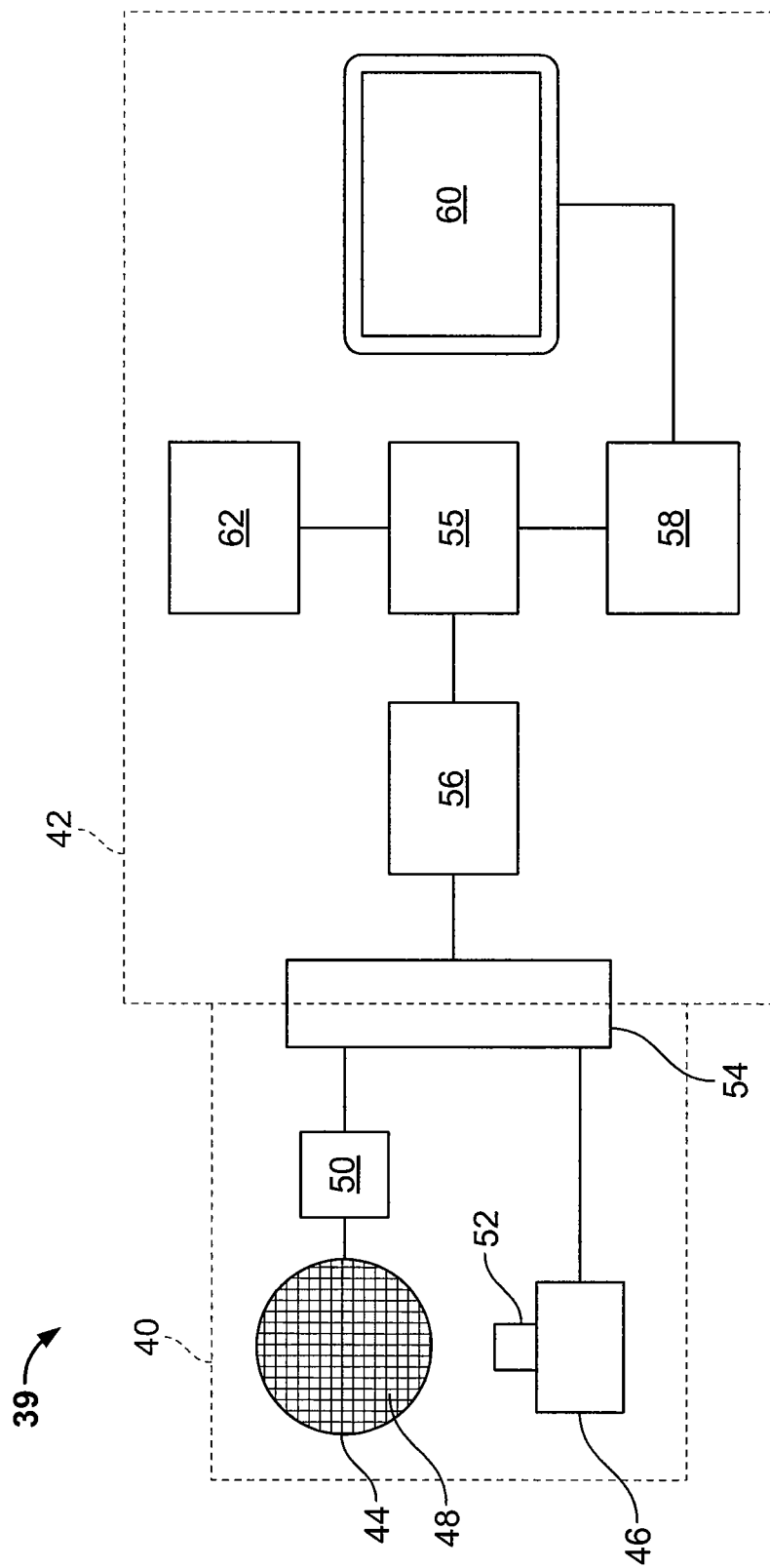

FIG. 4 is simplified block diagram of an input device connected to a computing device, in accordance with one embodiment of the present invention.

Figure 5:
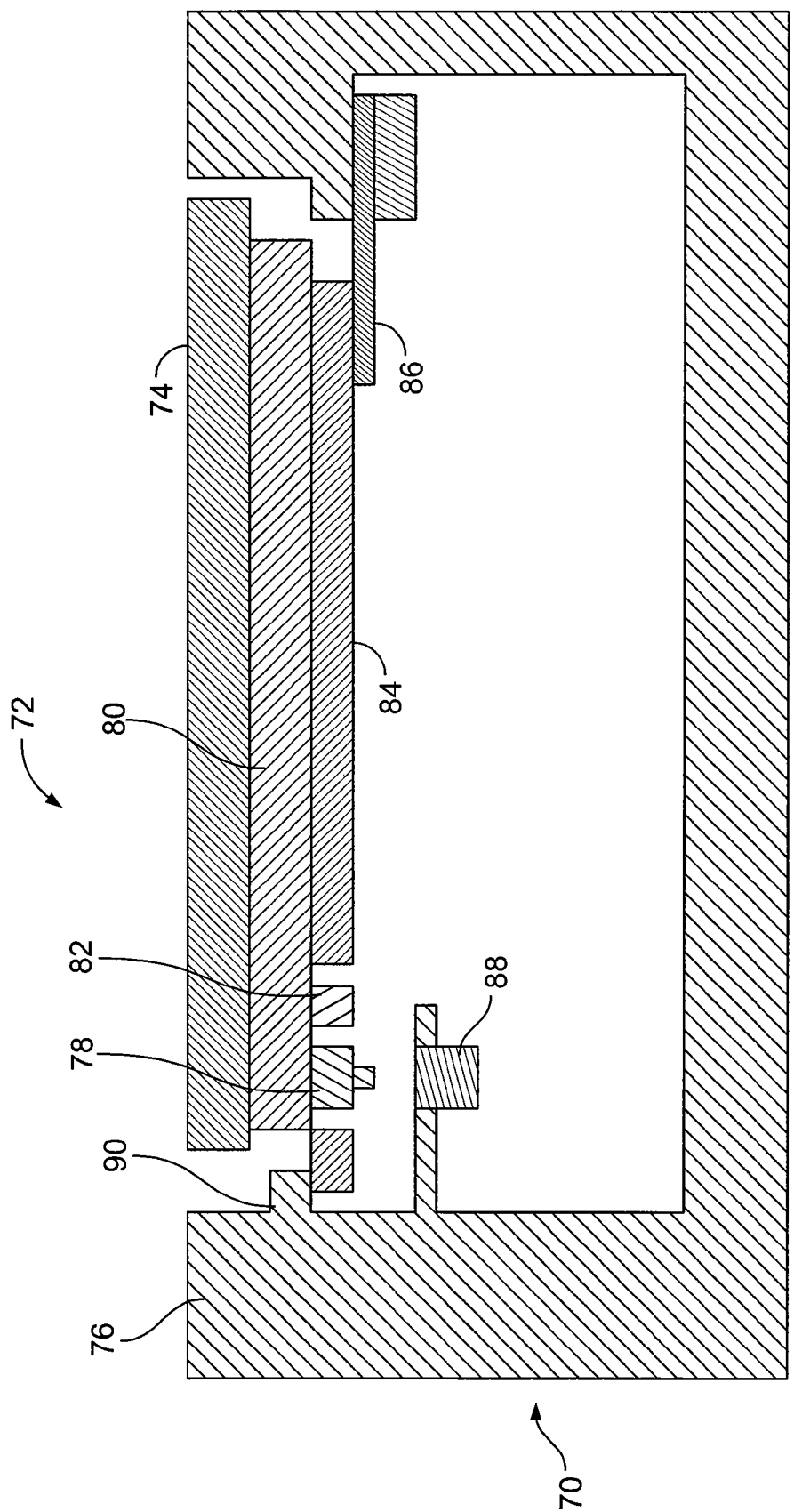

FIG. 5 is a side view, in cross section, of an input device, in accordance with one embodiment of the present invention.

Figure 6:
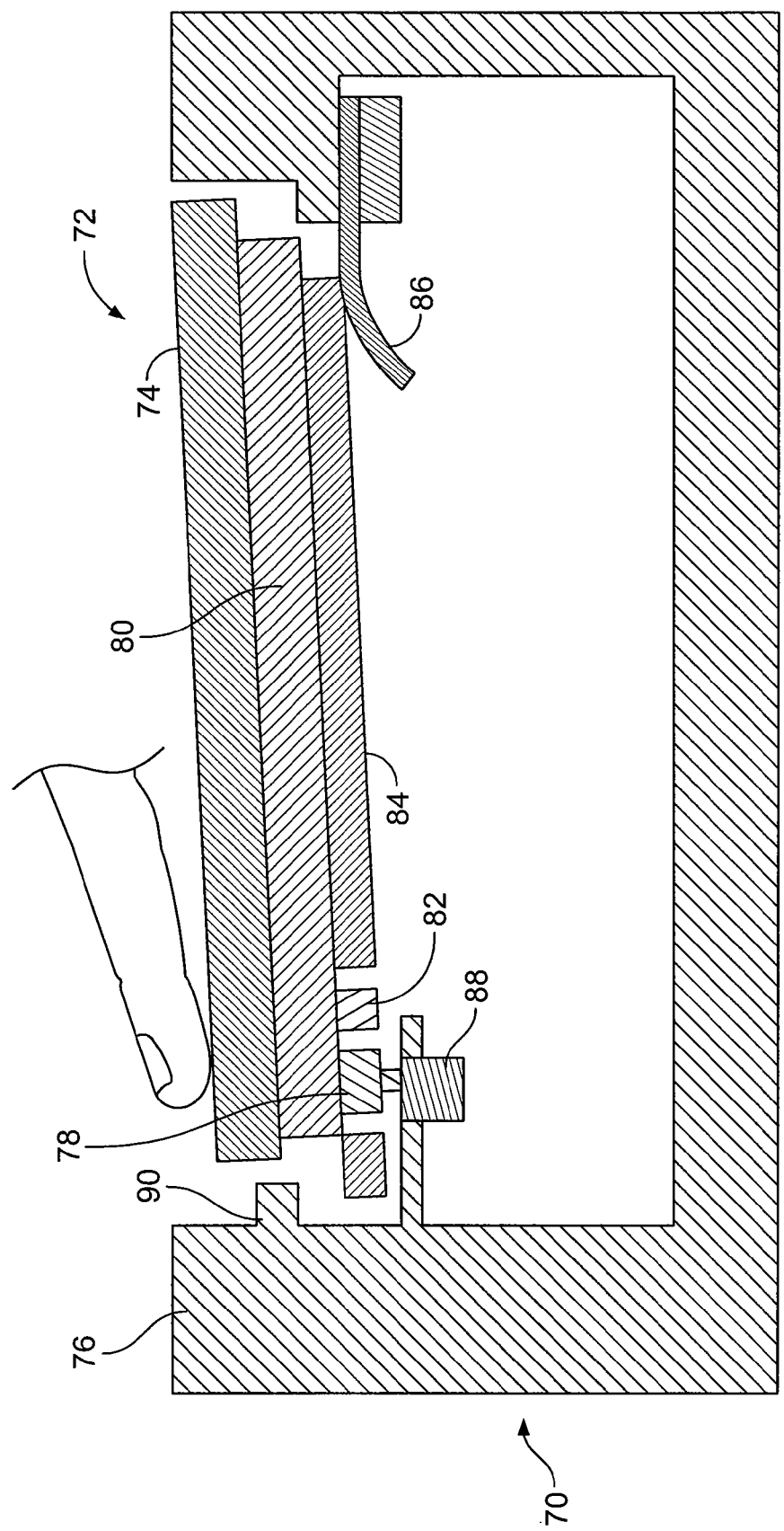

FIG. 6 is a another side view, in cross section, of the input device of FIG. 5.

Figure 7:
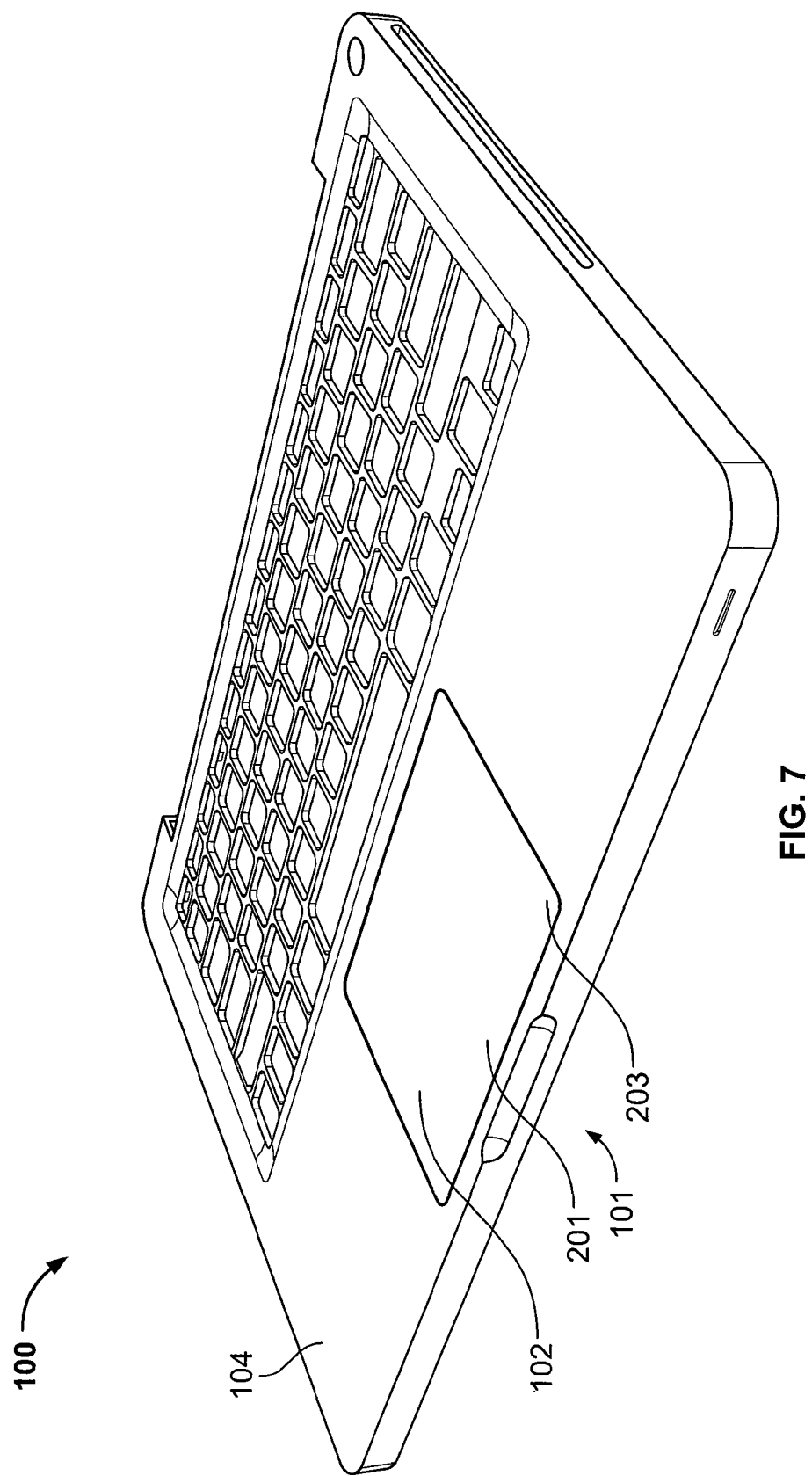

FIG. 7 is a perspective view of an input device being used as a track pad in a laptop computer, in accordance with one embodiment of the present invention.

Figure 8:
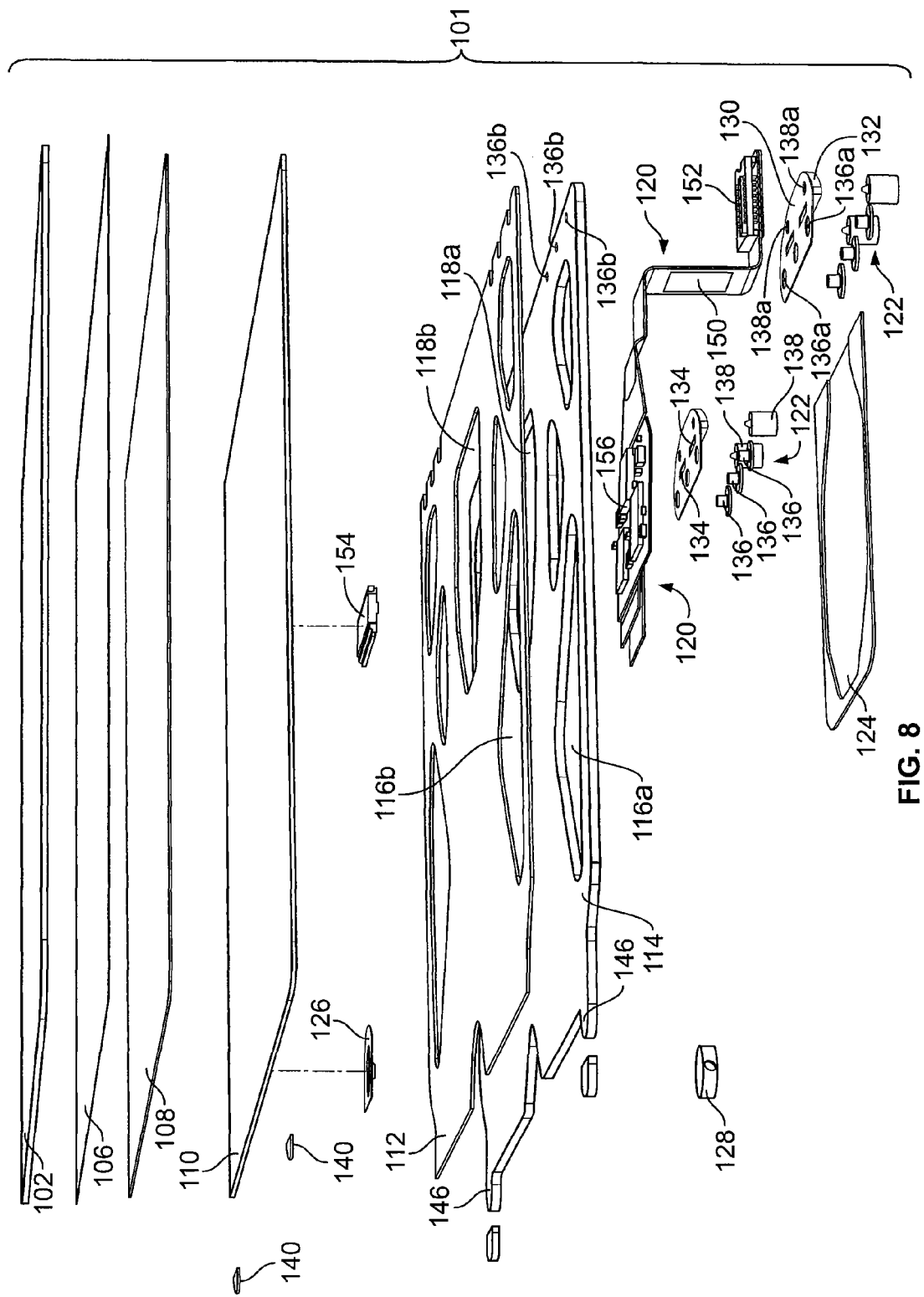

FIG. 8 is an exploded view of the input device of FIG. 7.

Figure 9:
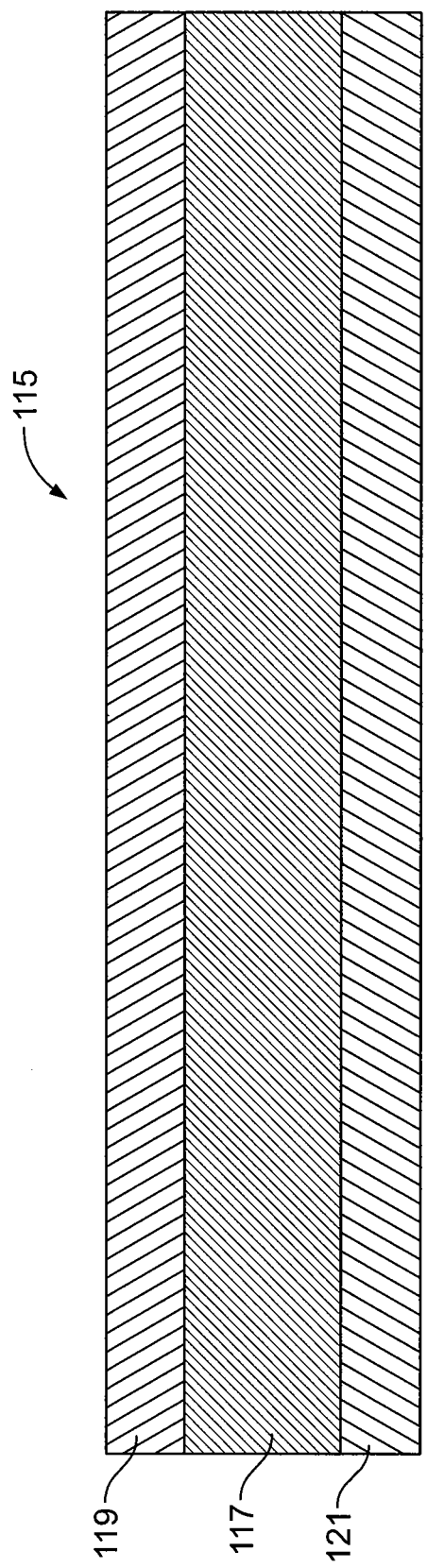

FIG. 9 is a side view, in cross section, of a stiffener.

Figure 10:
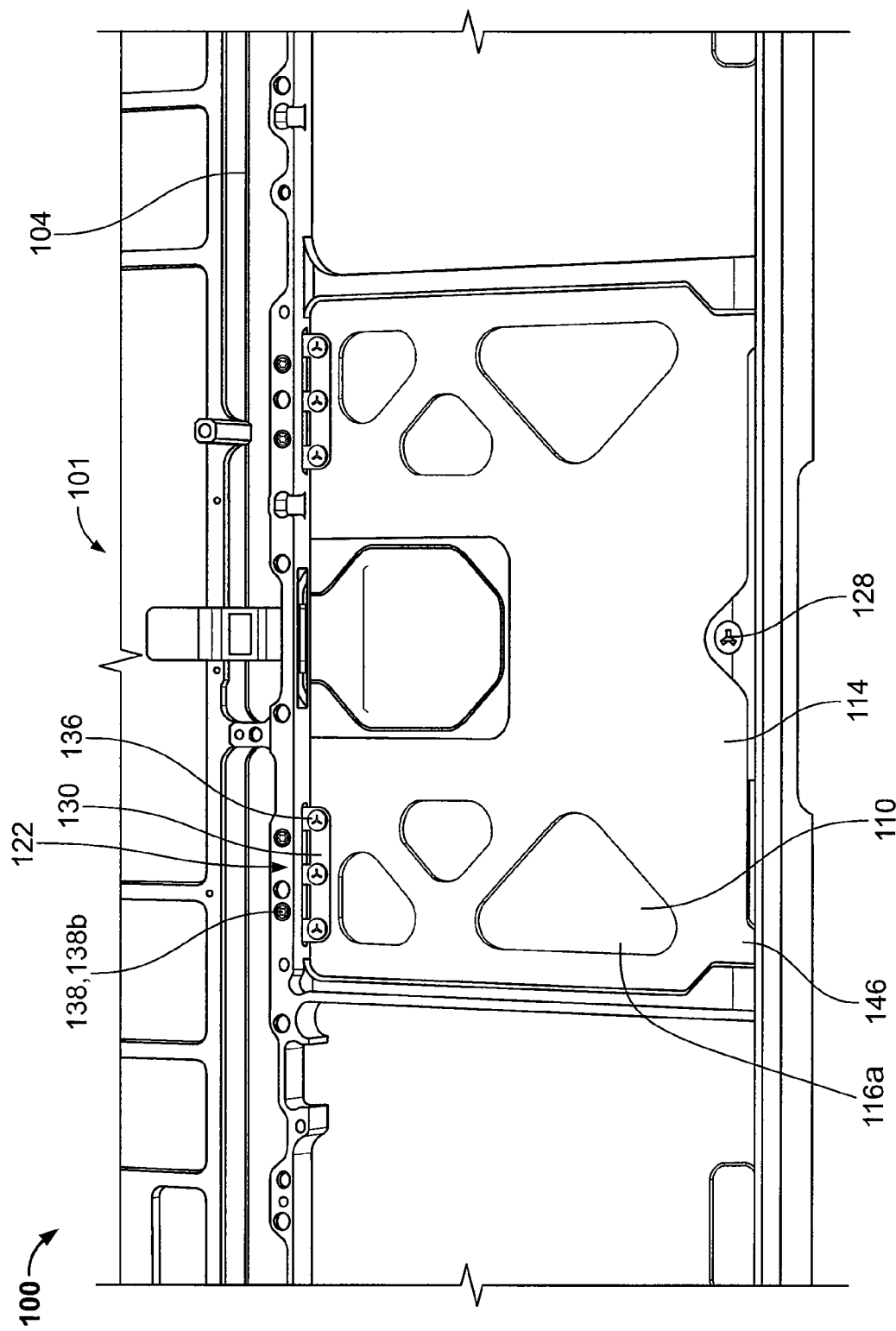

FIG. 10 is a bottom view of a portion of the input device of FIG. 7.

Figure 11:
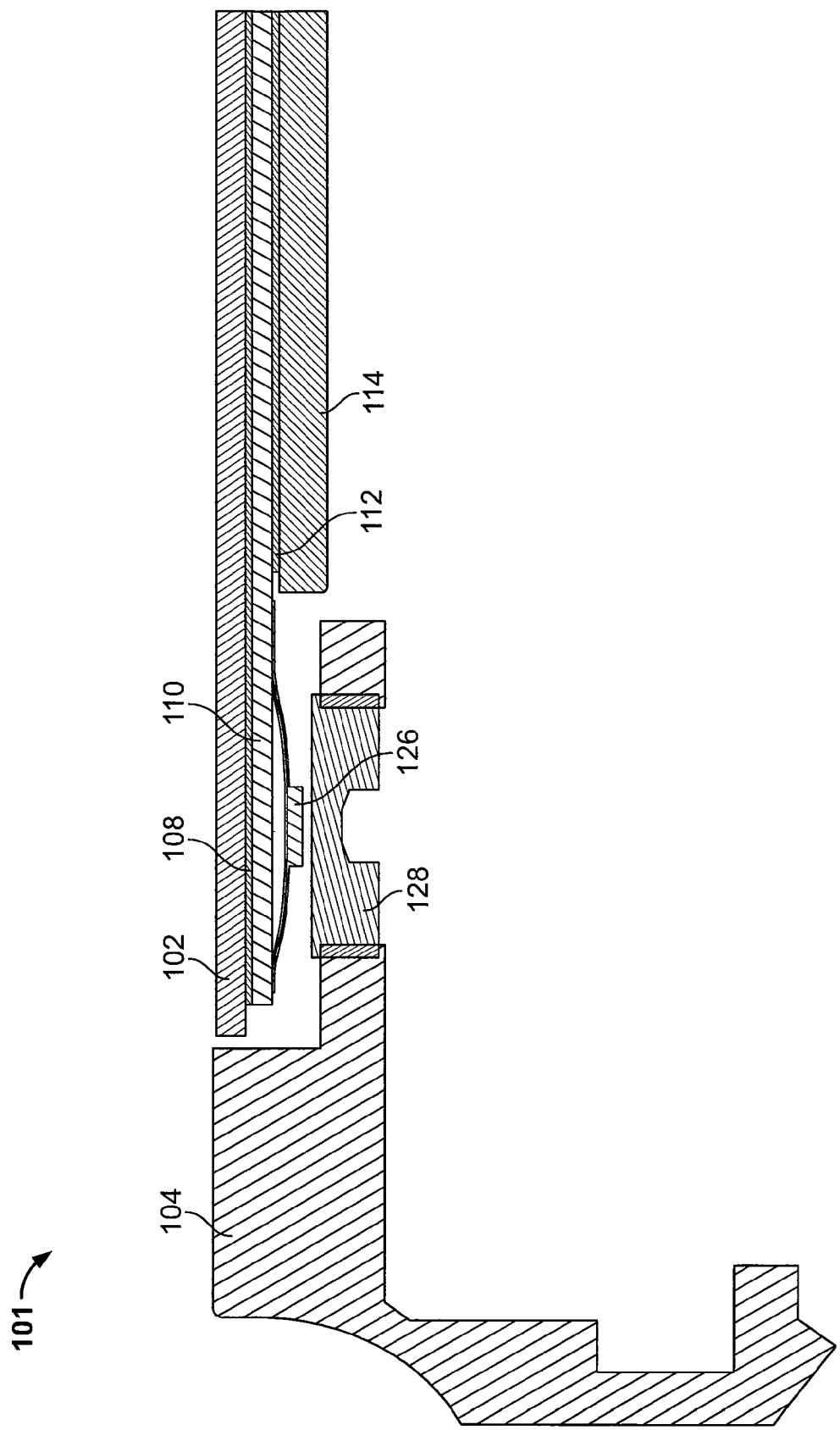

FIG. 11 is a side view, in cross section of a portion of the input device of FIG. 7.

Figure 12:
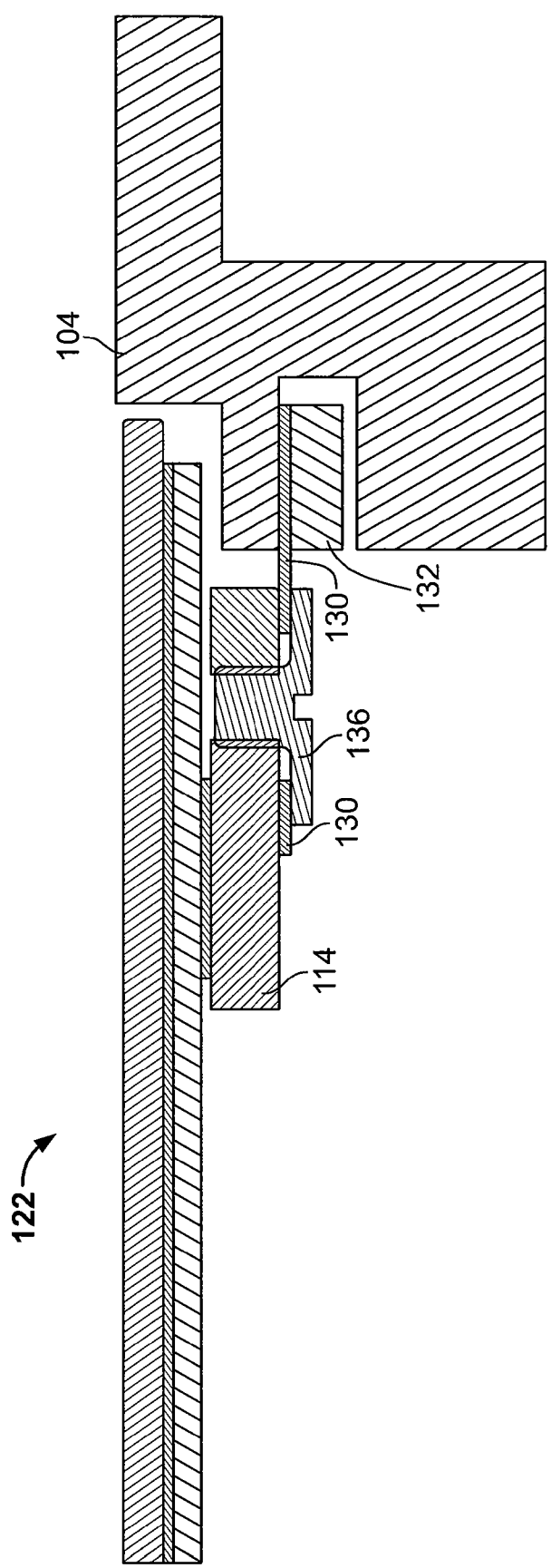

FIG. 12 is a side view, in cross section of a portion of the input device of FIG. 7.

Figure 13:
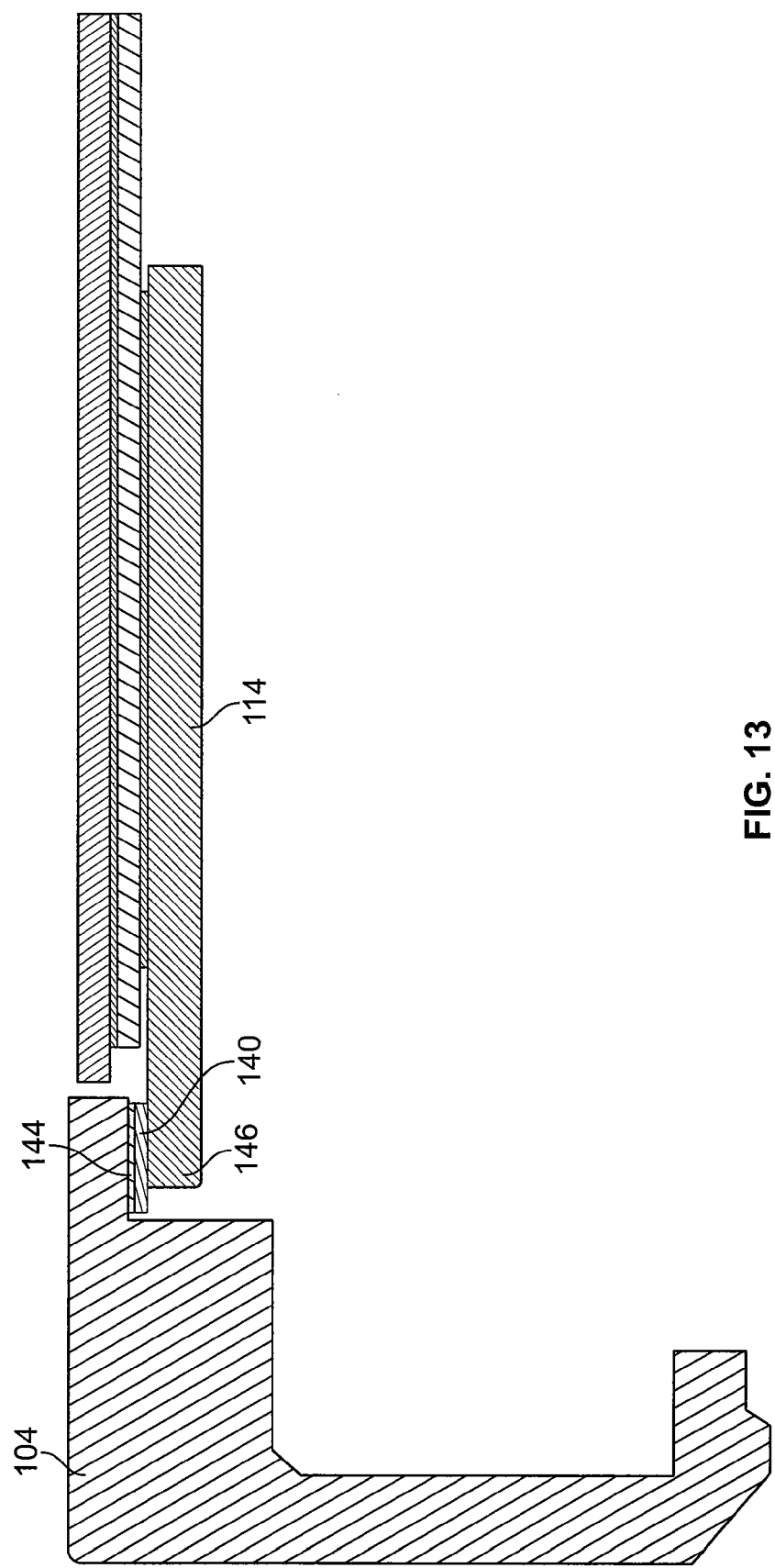

FIG. 13 is a side view, in cross section of a portion of the input device of FIG. 7.

Figure 14:
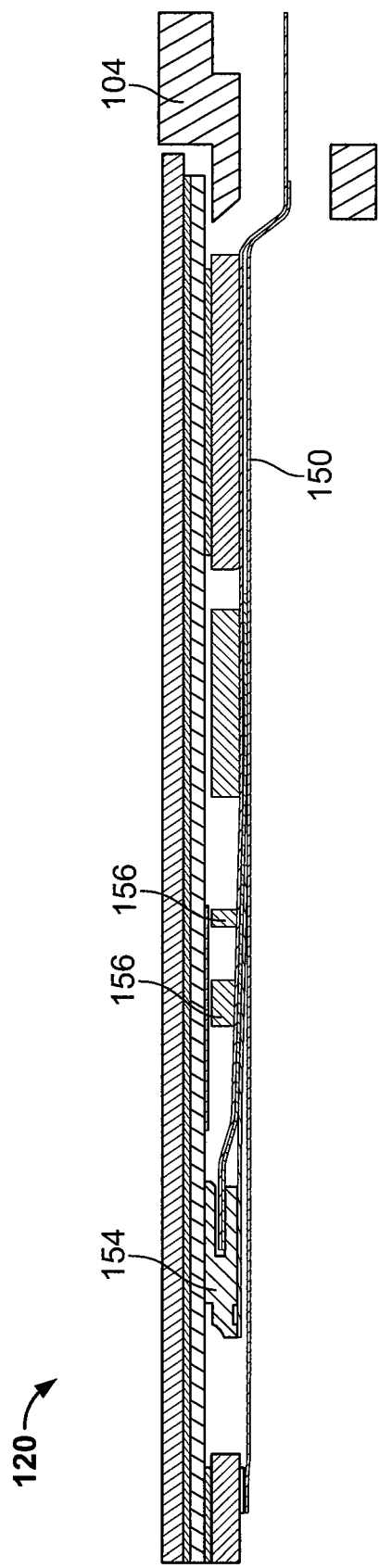

FIG. 14 is a side view, in cross section of a portion of the input device of FIG. 7.

Figure 15:
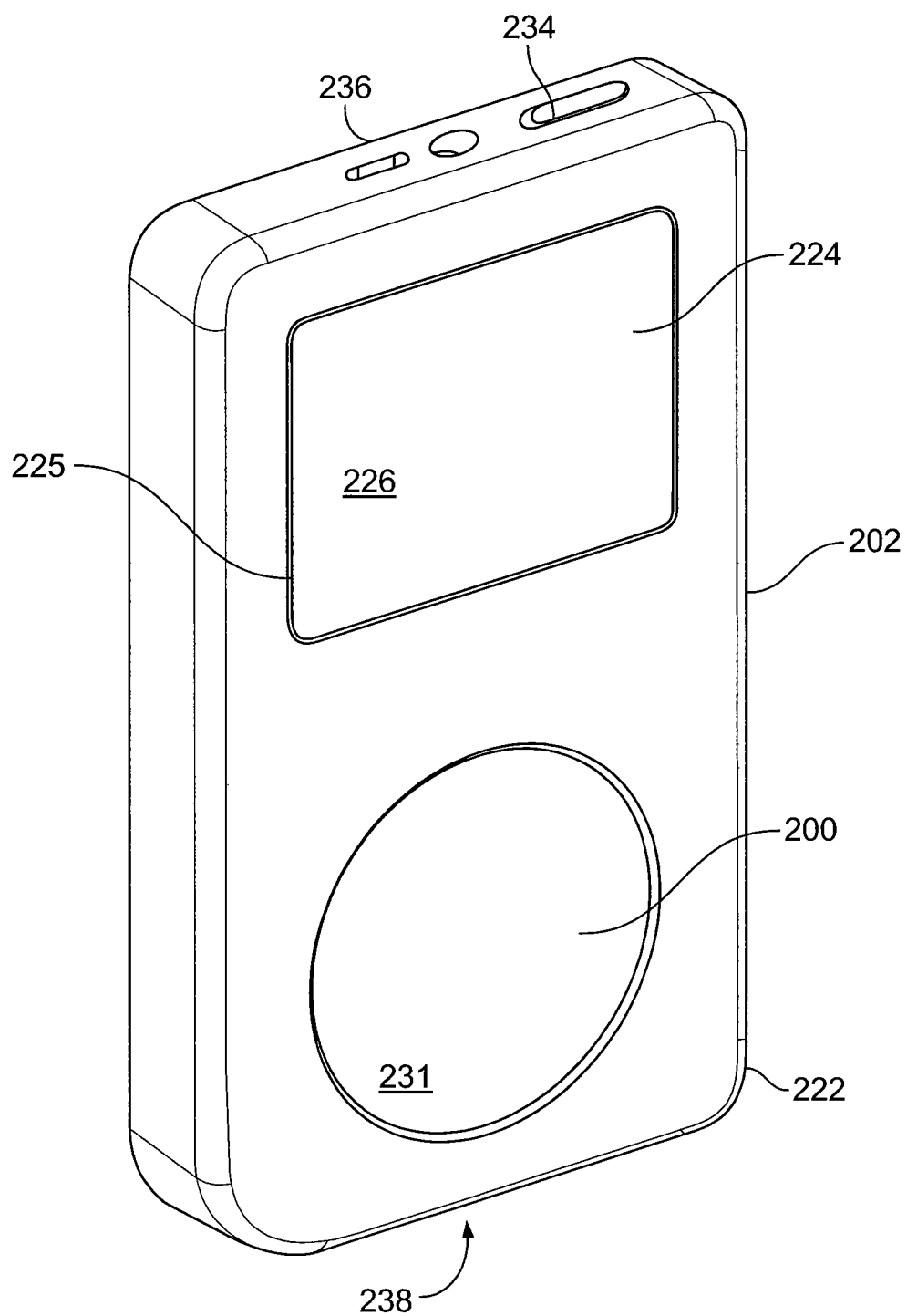

FIG. 15 is a perspective diagram of a media player, in accordance with one embodiment of the present invention.

Figure 16:
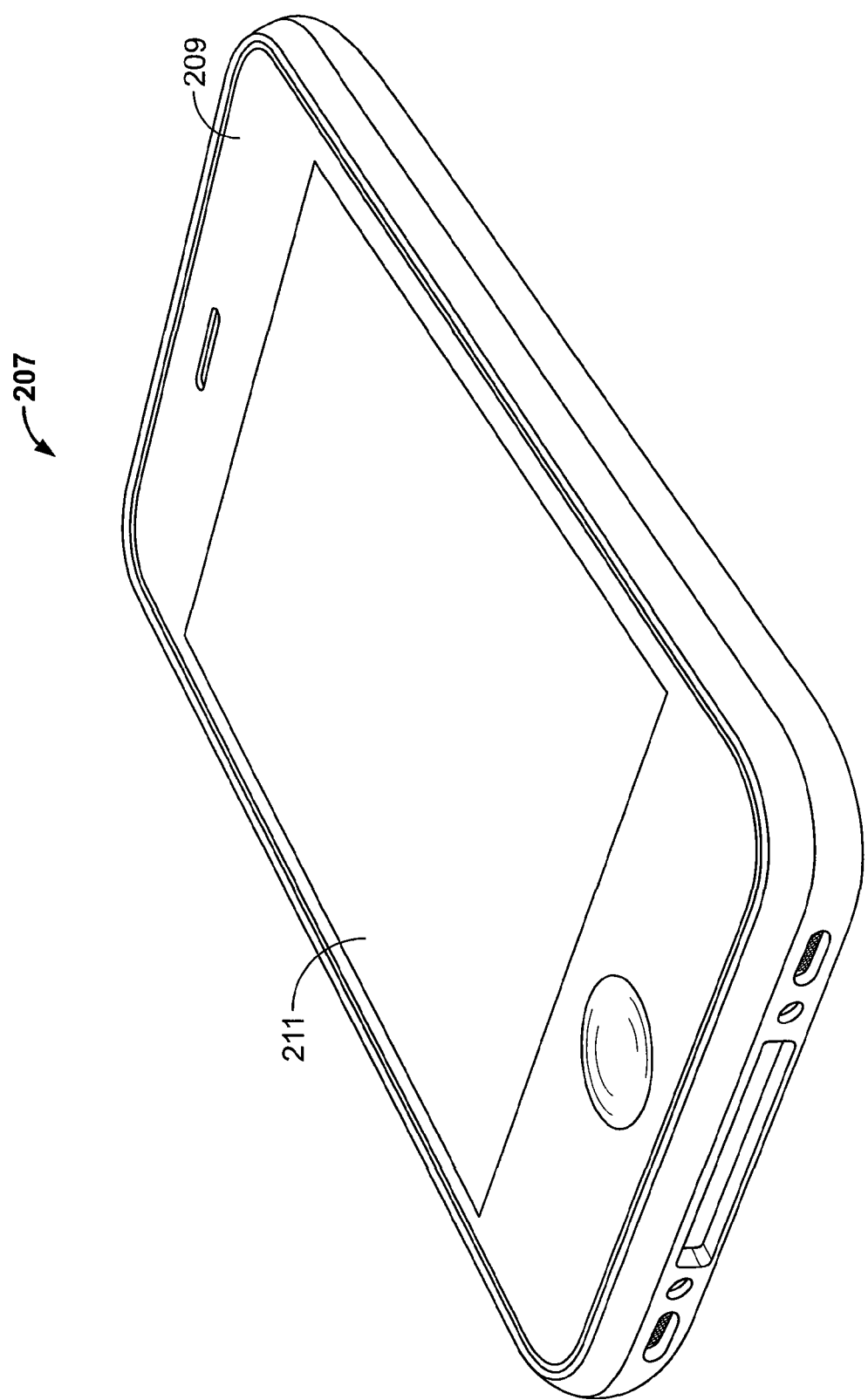

FIG. 16 is a perspective diagram of a mobile phone, in accordance with one embodiment of the present invention.

Figure 17:
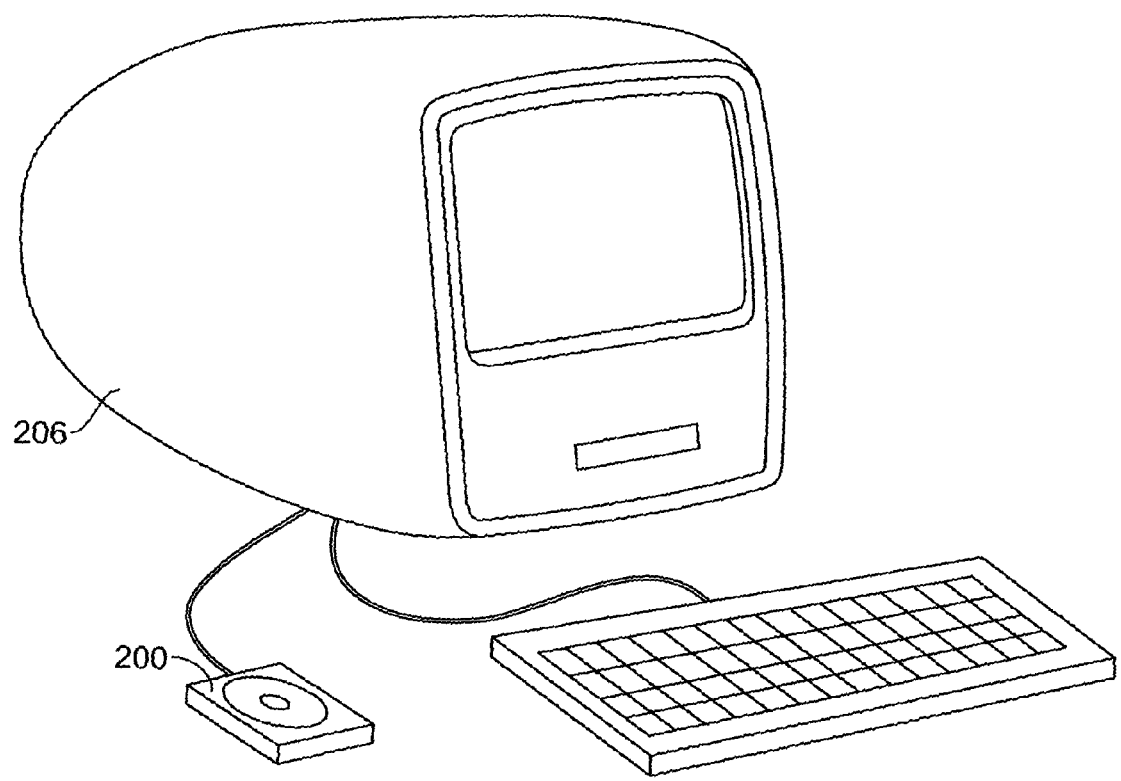
Figure 18:
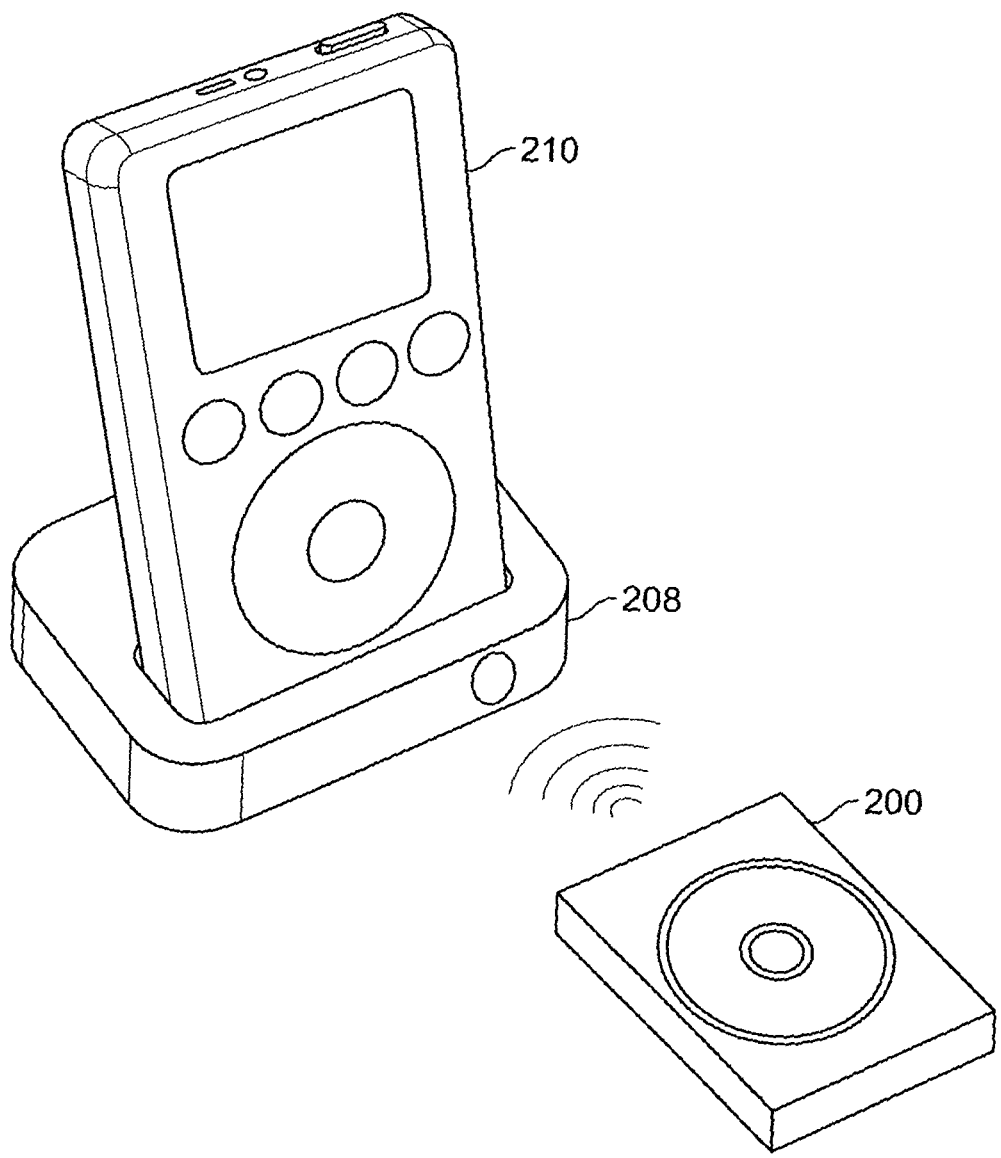

FIG. 17 is a perspective diagram of a desktop computer with a peripheral input device connected thereto, in accordance with one embodiment of the present invention FIG. 18 is a perspective diagram of a remote control utilizing an input device, in accordance with one embodiment of the present invention.

Figure 19:
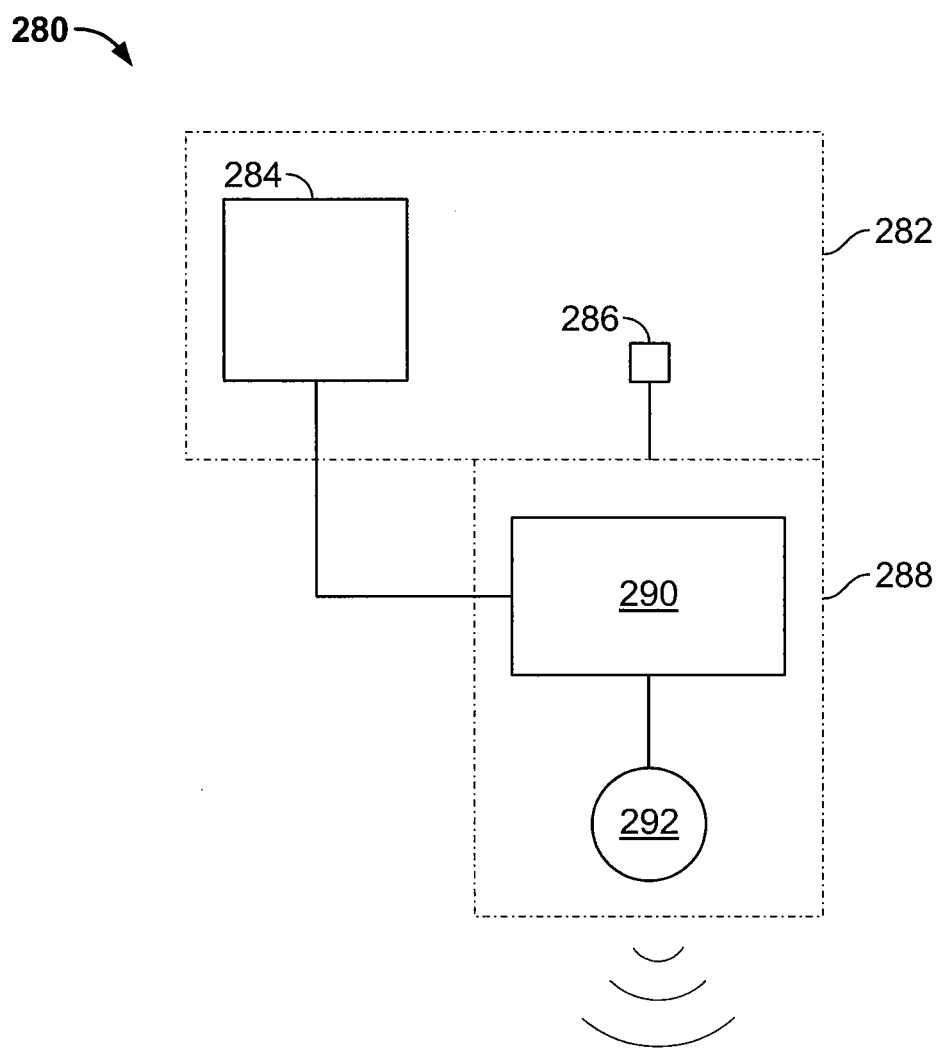

FIG. 19 is a simplified block diagram of a remote control, in accordance with one embodiment of the present invention.

FIGS. 20A, 20B, 20C, 20D, 20E, and 20F are top views of track pads having delineated zones, in accordance with one embodiment of the present invention.

Figure 21:
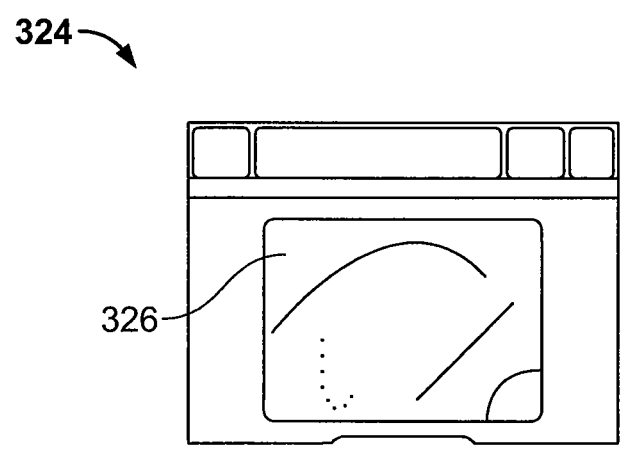

FIG. 21 is a top view of a track pad having a full pixel display, in accordance with one embodiment of the present invention.

Figure 22:
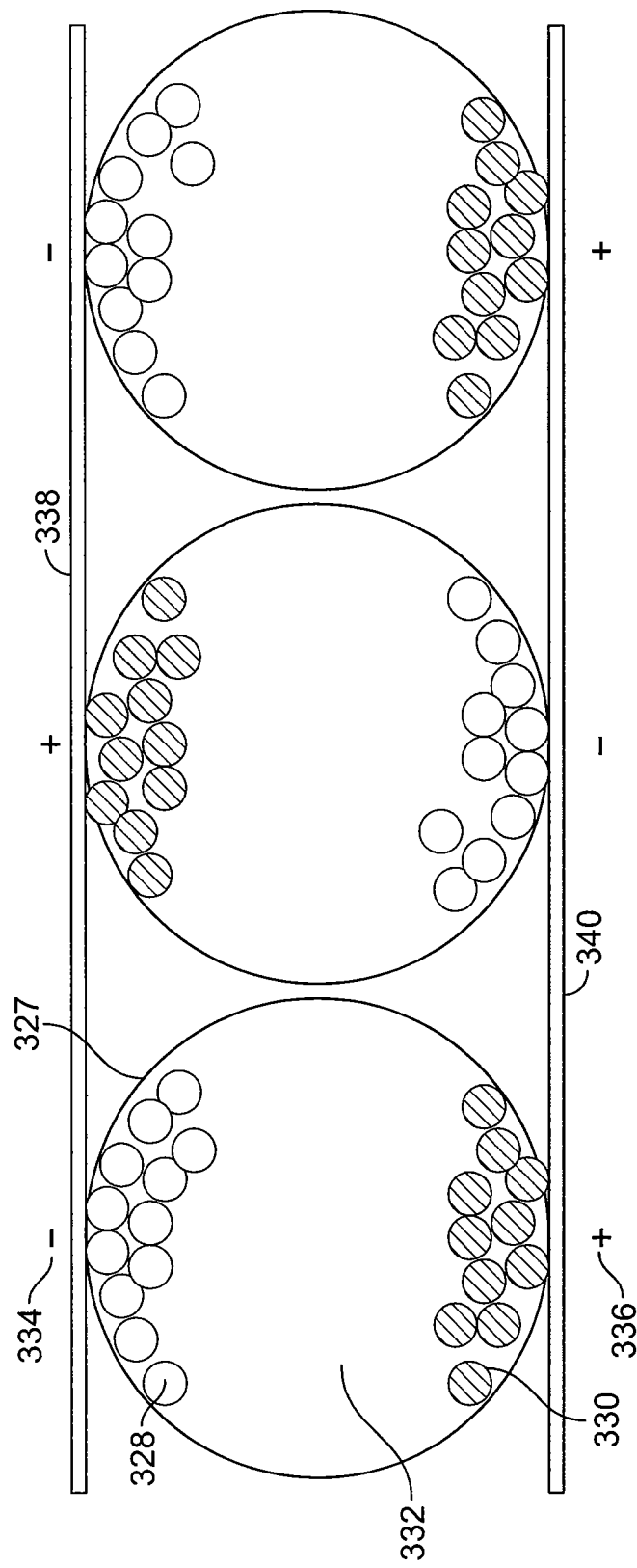

FIG. 22 is side view, in cross section of electronic ink, in accordance with one embodiment of the present invention.

FIG. 23 is a side view of a piece of glass, in accordance with one embodiment of the present invention.

FIG. 24A is a side view of a piece of etched glass, in accordance with one embodiment of the present invention.

Figure 24B:
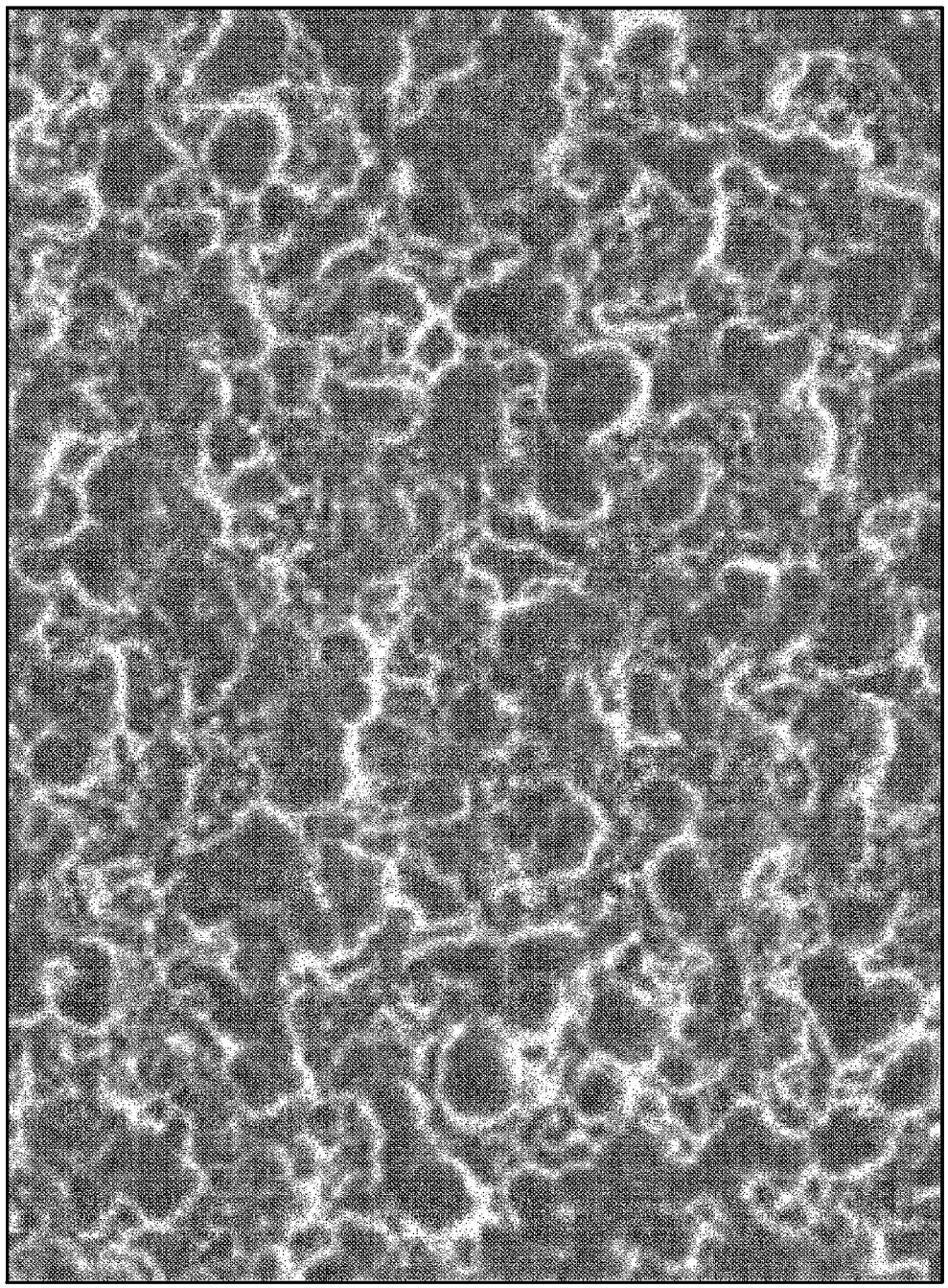

FIG. 24b is a top magnified view of the piece of glass shown in FIG. 24b.

FIG. 25 is a side view of a piece of etched glass, in accordance with one embodiment of the present invention.

Figure 26:
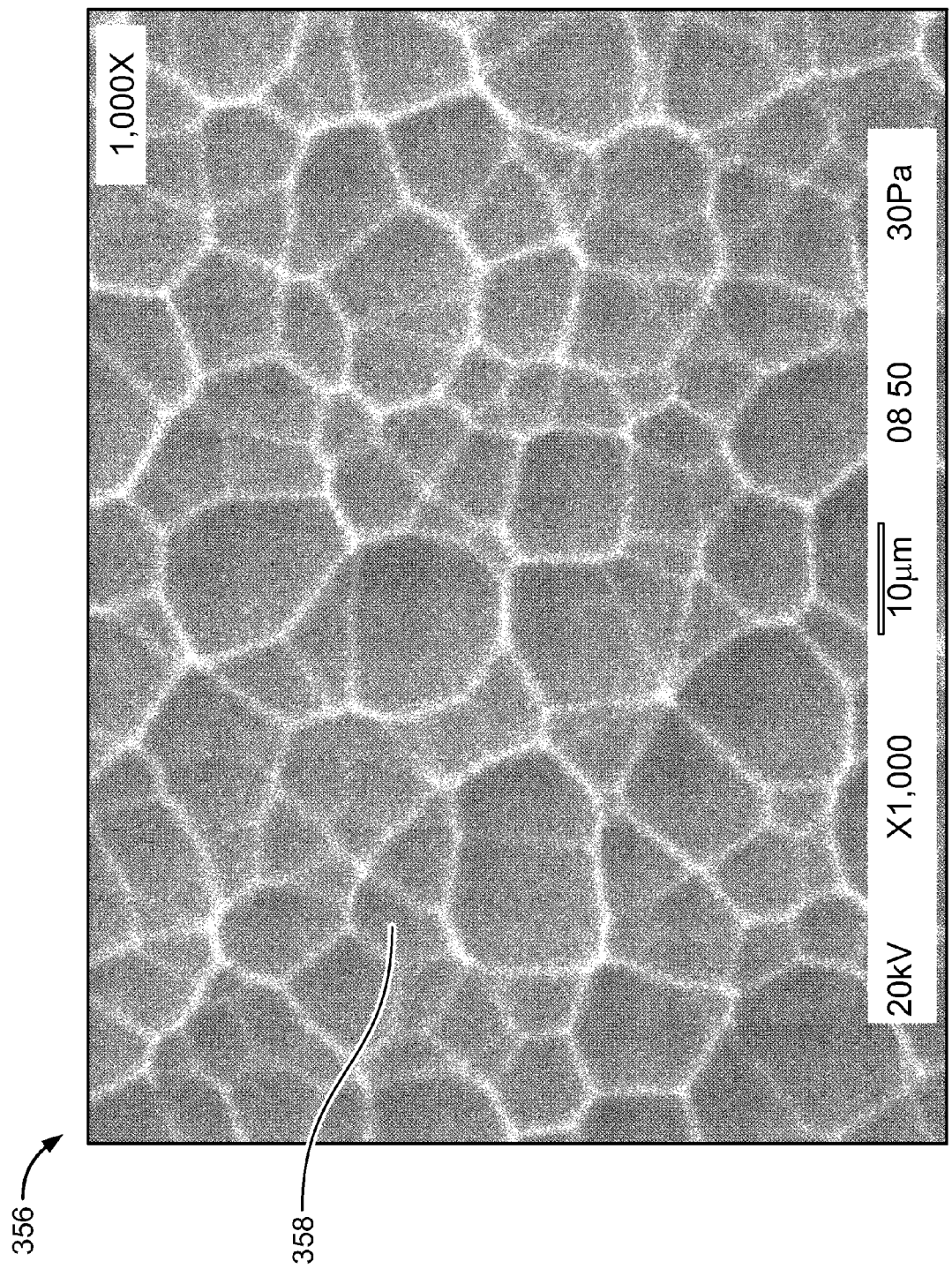

FIG. 26 is a top view of the surface of the piece of glass shown in FIG. 25.

Figure 27:
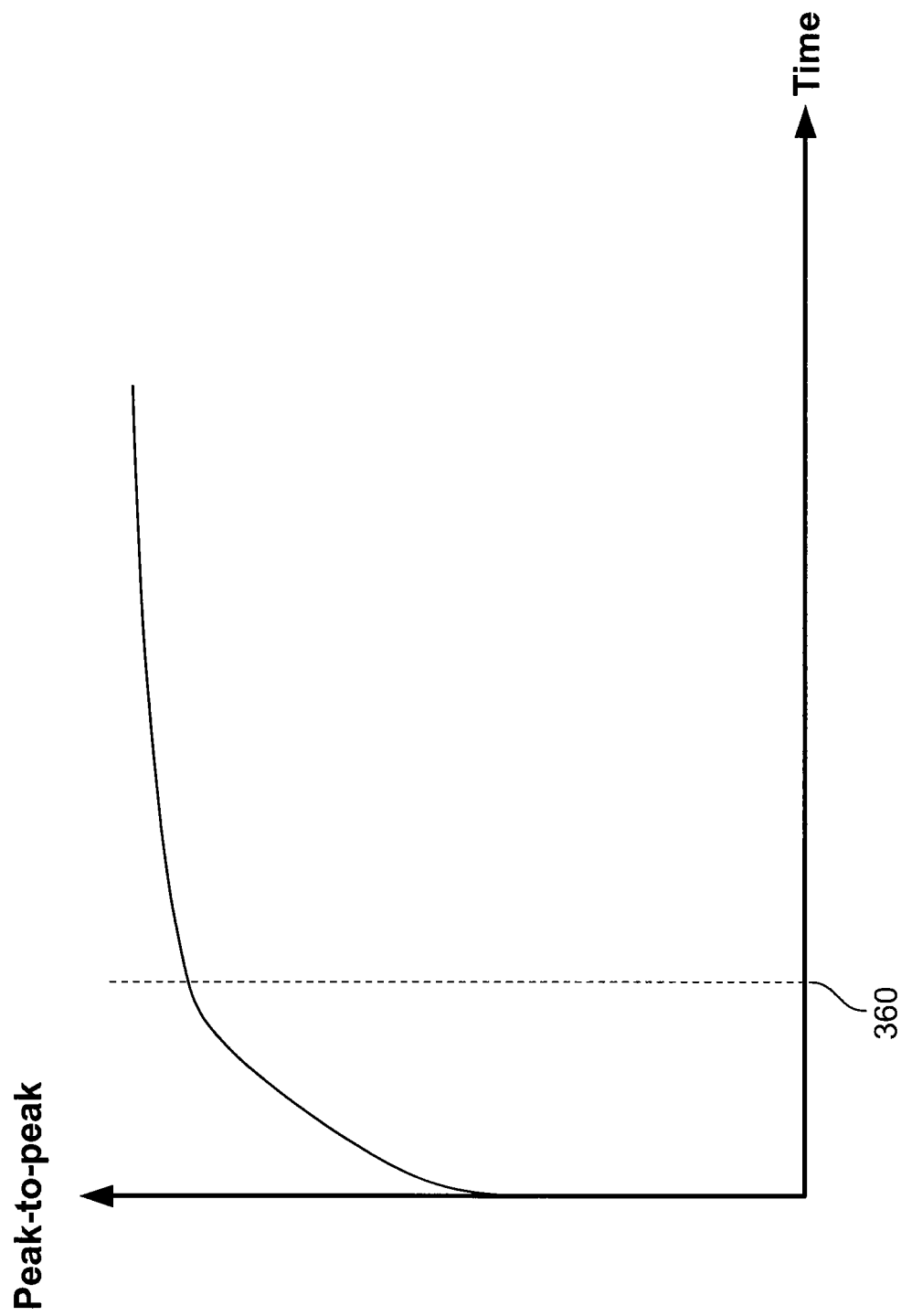

FIG. 27 is a graph of the peak-to-peak ratio of the glass surface shown in FIGS. 25 and 26.

Figure 28:
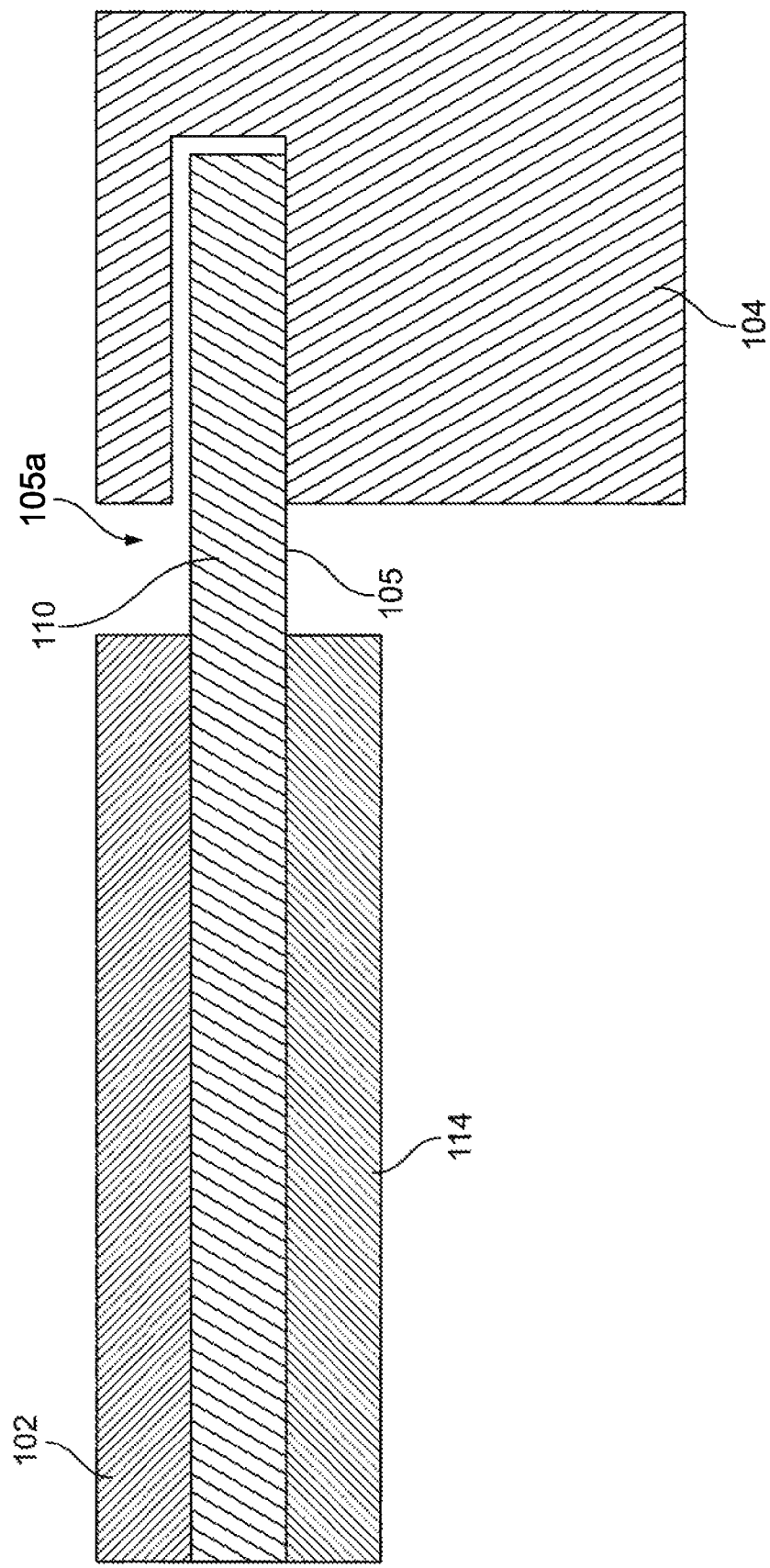

FIG. 28 is a side view, in cross section of a portion of an input device, in accordance with one embodiment of the present invention.

Figure 29:
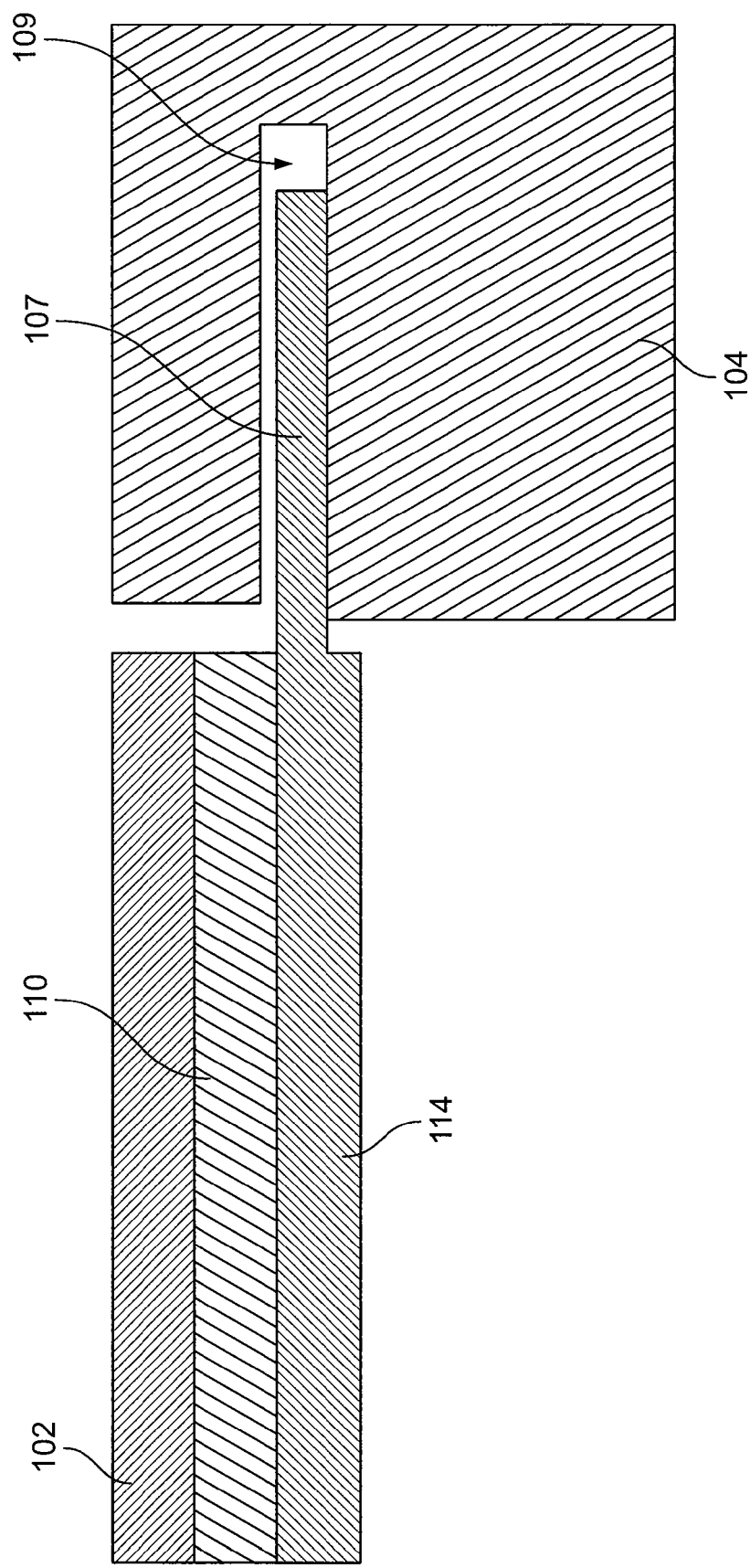

FIG. 29 is a side view, in cross section of a portion of an input device, in accordance with one embodiment of the present invention.

Figure 30:
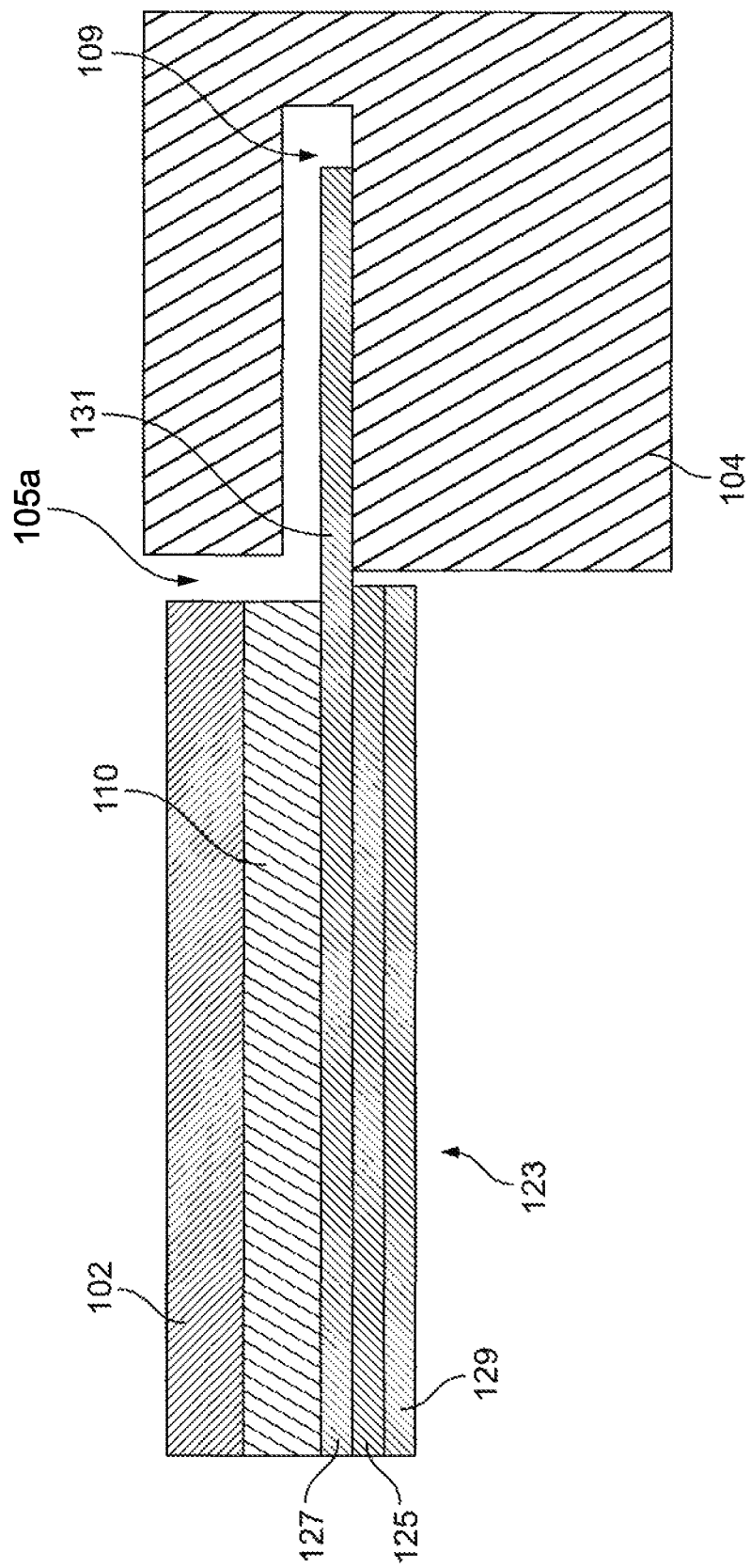

FIG. 30 is a side view, in cross section of a portion of an input device, in accordance with one embodiment of the present invention.

Figure 31:
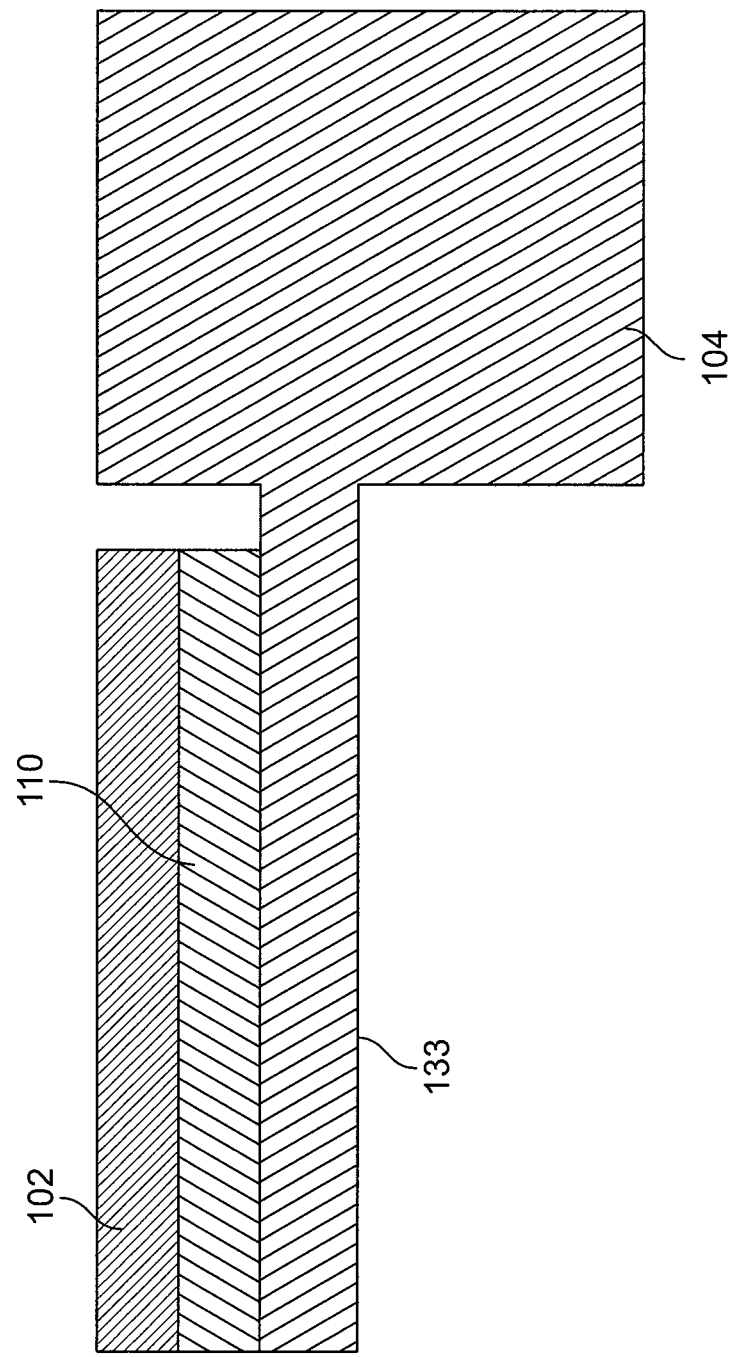

FIG. 31 is a side view, in cross section of a portion of an input device, in accordance with one embodiment of the present invention.

Figure 32:
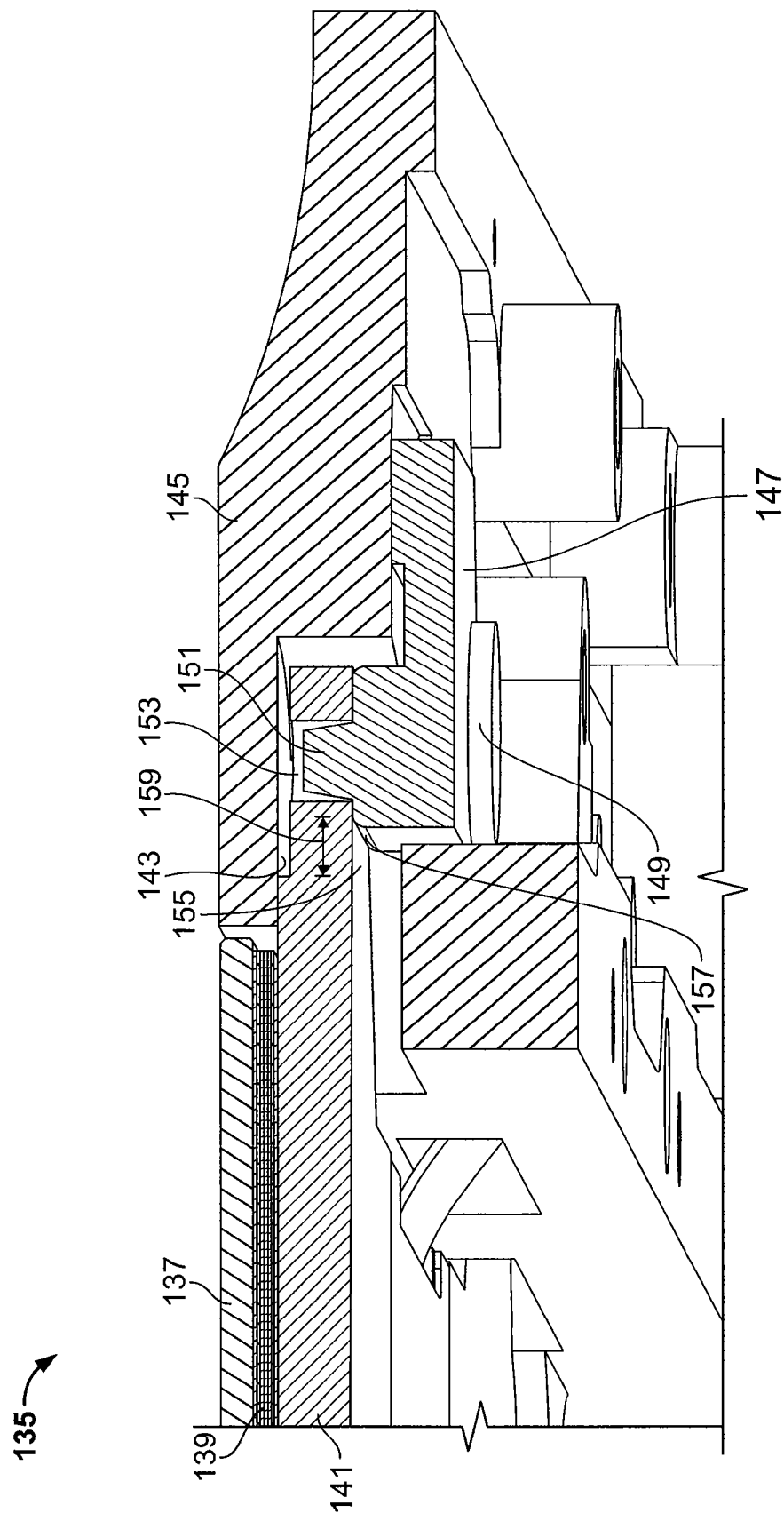

FIG. 32 is a side view of an input device, in accordance with one embodiment of the present invention.

Figure 33:
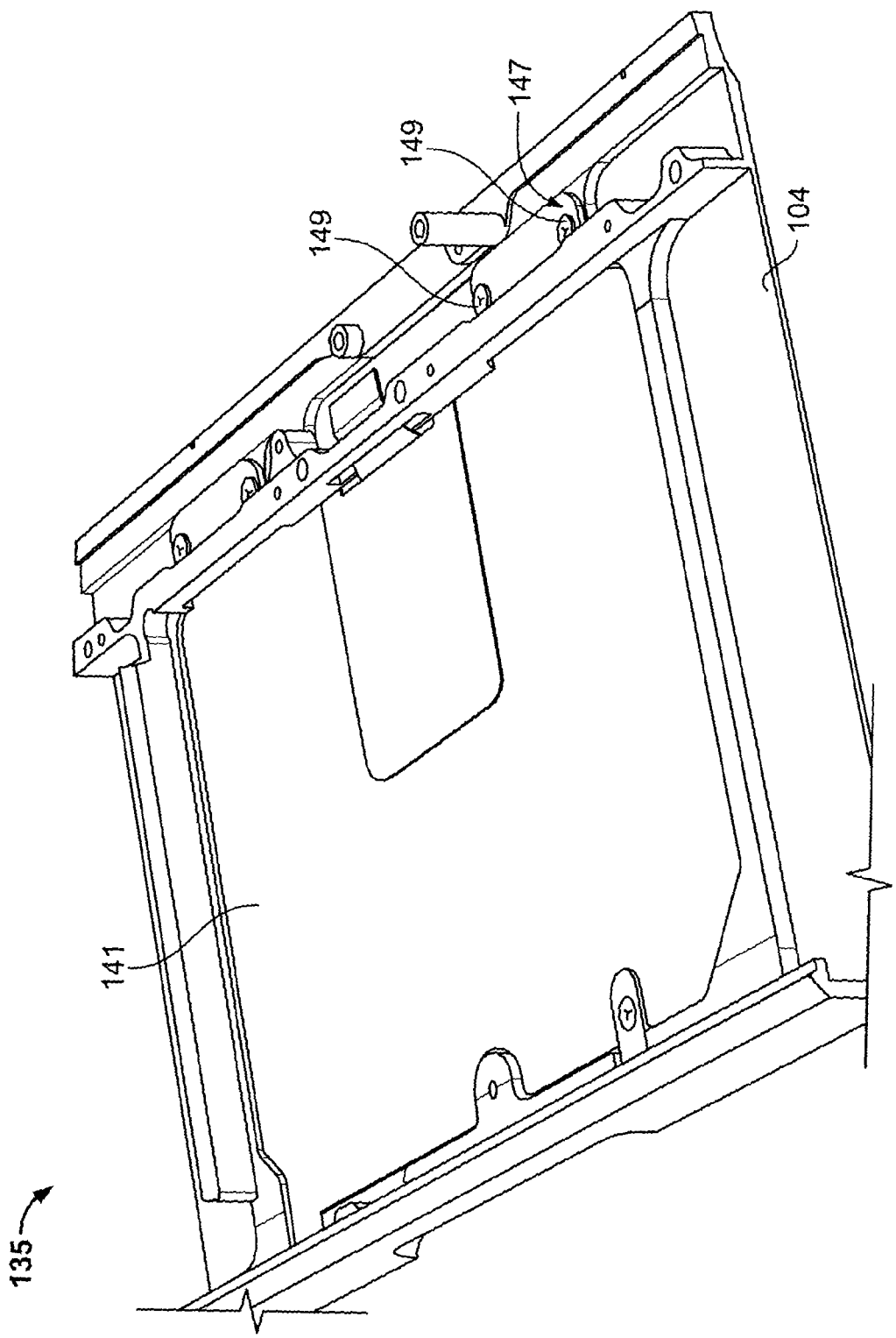

FIG. 33 is a bottom view of the input device of FIG. 32.

Figure 34A:
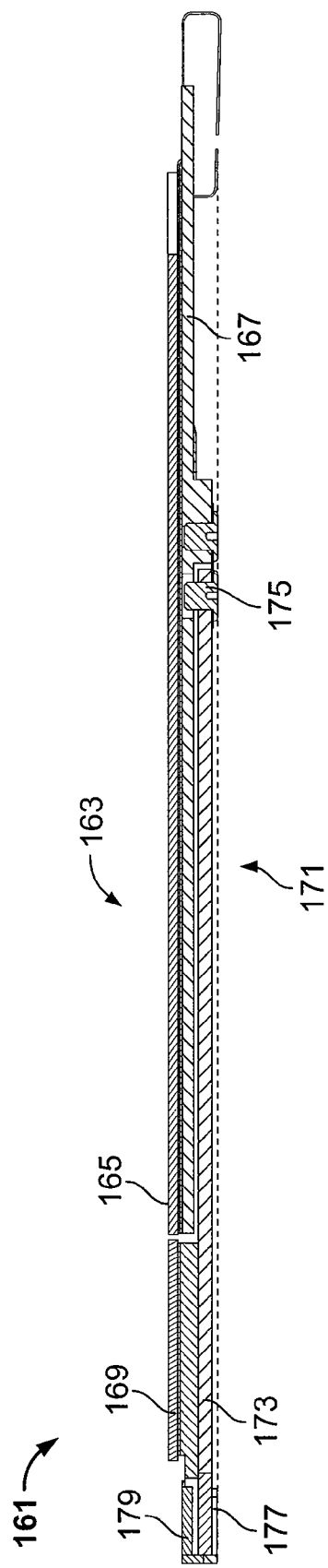

FIG. 34A is a side view, in cross section, of an input device, in accordance with one embodiment of the present invention.

Figure 34B:
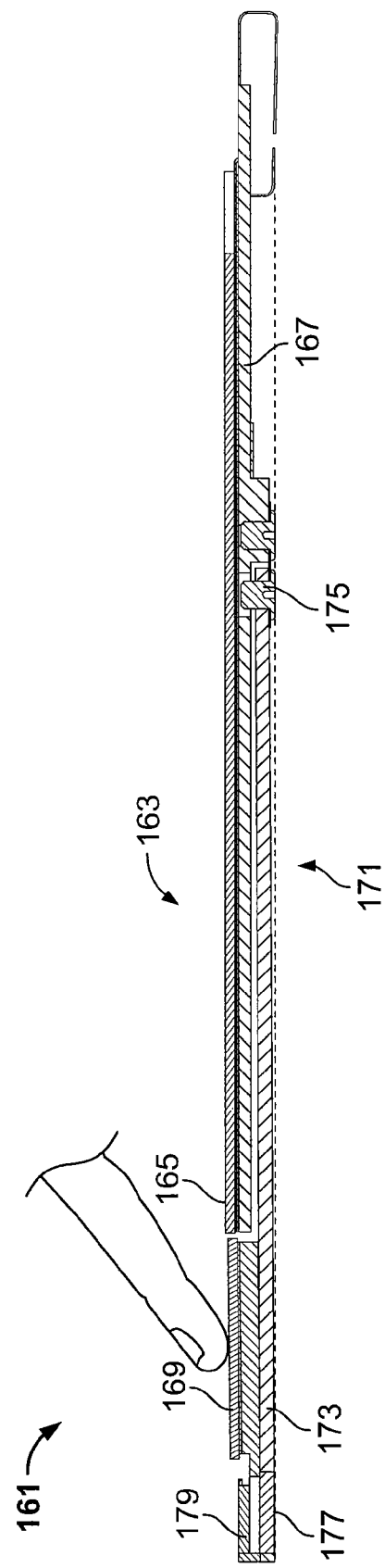

FIG. 34B is a side view, in cross section, of an input device, in accordance with one embodiment of the present invention.

DETAILED DESCRIPTION OF THE INVENTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

With regards to track pads, mice and track balls, a Cartesian coordinate system is used to monitor the position of the finger, mouse and ball, respectively, as they are moved. The Cartesian coordinate system is generally defined as a two dimensional coordinate system (x,y) in which the coordinates of a point (e.g., position of finger, mouse or ball) are its distances from two intersecting, often perpendicular straight lines, the distance from each being measured along a straight line parallel to each other. For example, the x, y positions of the mouse, ball and finger may be monitored. The x, y positions are then used to correspondingly locate and move the input pointer on the display screen.

Track pads generally include one or more sensors for detecting the proximity of the finger thereto. By way of example, the sensors may be based on resistive sensing, surface acoustic wave sensing, pressure sensing, optical sensing, capacitive sensing and the like. The sensors are generally dispersed about the track pad with each sensor representing an x, y position. In most cases, the sensors are arranged in a grid of columns and rows. Distinct x and y position signals, which control the x, y movement of a pointer device on the display screen, are thus generated when a finger is moved across the grid of sensors within the track pad. For brevity sake, the remaining discussion will be held to the discussion of capacitive sensing technologies. It should be noted, however, that the other technologies have similar features.

Capacitive sensing surfaces generally contain several layers of material. For example, the capacitive sensing surface may include a protective/cosmetic shield (usually a dielectric material), one or more electrode layers and a circuit board. The protective shield typically covers the electrode layer(s), and the electrode layer(s) is generally disposed on a front side of the circuit board. The electrode layer and circuit board may be, for example, a printed circuit board (PCB). The protective shield is the part of the capacitive sensing surface that is touched by the user to implement cursor movements on a display screen. The electrode layer(s), on the other hand, is used to interpret the x, y position of the user's finger when the user's finger is resting or moving on the protective shield. The electrode layer (s) typically consists of a plurality of electrodes that are positioned in columns and rows so as to form a grid array. The columns and rows are generally based on the Cartesian coordinate system and thus the rows and columns correspond to the x and y directions.

The capacitive sensing surface may also include sensing electronics for detecting signals associated with the electrodes. For example, the sensing electronics may be adapted to detect the change in capacitance at each of the electrodes as the finger passes over the grid. The sensing electronics are generally located on the backside of the circuit board. By way of example, the sensing electronics may include an application specific integrated circuit (ASIC) that is configured to measure the amount of capacitance in each of the electrodes and to compute the position of finger movement based on the capacitance in each of the electrodes. The ASIC may also be configured to report this information to the computing device.

Figure 1:
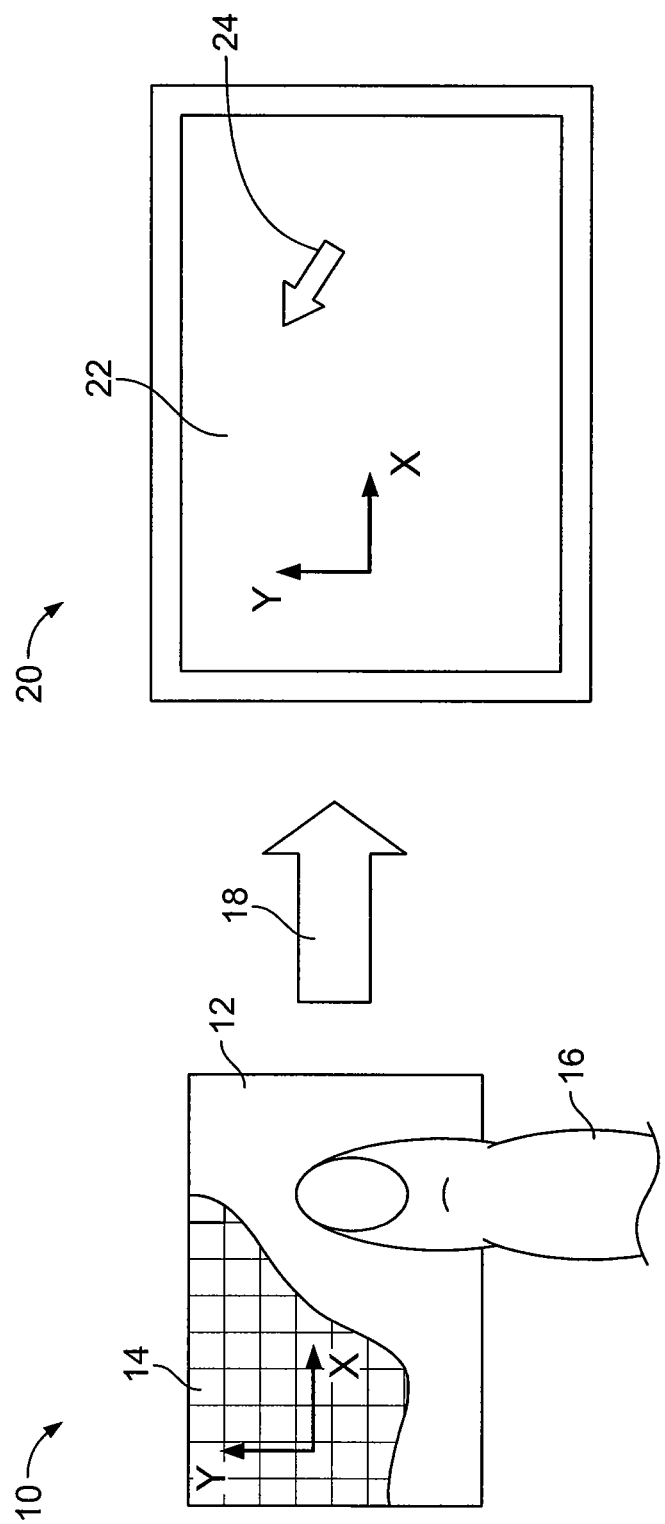
FIG. 1 is a simplified diagram of a touch pad and display.
Figure 2:
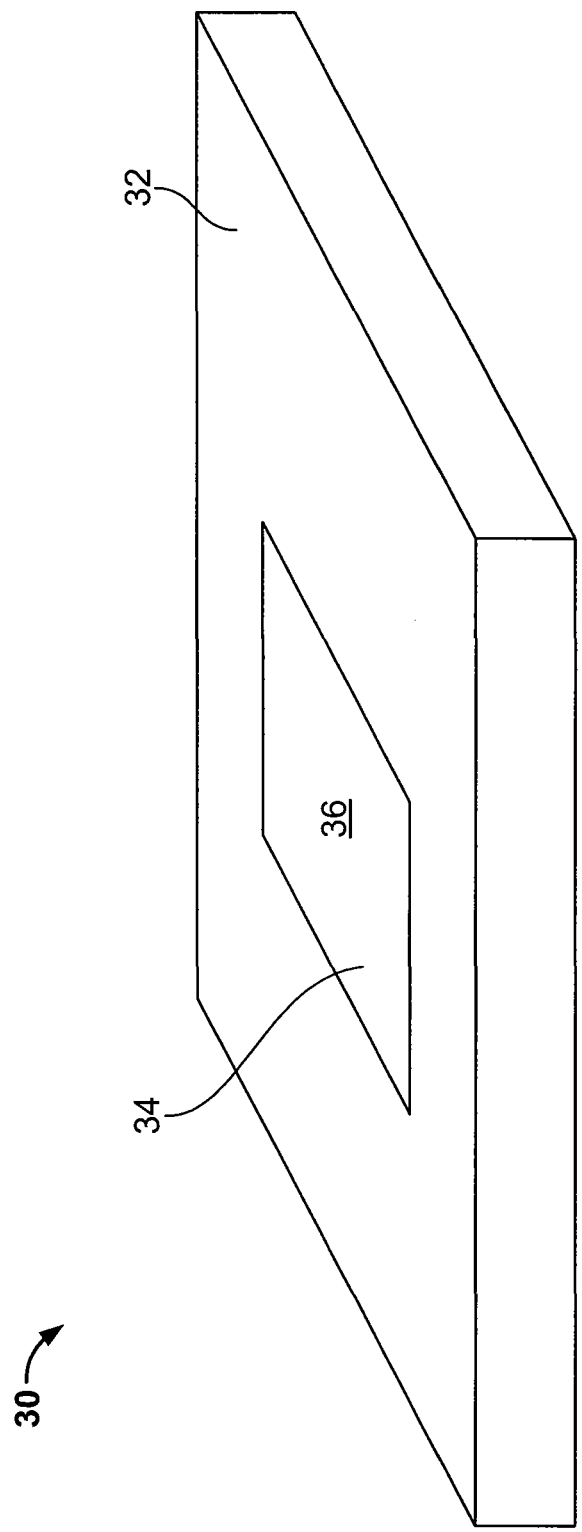
FIG. 2 is a perspective view of an input device, in accordance with one embodiment of the present invention.

Referring to FIG. 1, a touch-sensitive track pad 10 will be described in greater detail. The track pad is generally a small (often rectangular) area that includes a protective/cosmetic shield 12 and a plurality of electrodes 14 disposed underneath the protective shield 12. Electrodes 14 may be located on a circuit board, for example a printed circuit board (PCB). For ease of discussion, a portion of the protective shield 12 has been removed to show the electrodes 14. Each of the electrodes 14 represents a different x, y position. In one configuration, as a finger 16 (or alternately a stylus, not shown) approaches the electrode grid 14, a tiny capacitance forms between the finger 16 and the electrodes 14 proximate the finger 16. The circuit board/sensing electronics (not shown) measures capacitance and produces an x, y input signal 18 corresponding to the active electrodes 14 which is sent to a host device 20 (e.g., a computing device) having a display screen 22. The x, y input signal 18 is used to control the movement of a cursor 24 on a display screen 22. As shown, the input pointer moves in a similar x, y direction as the detected x, y finger motion. FIG. 2 is a simplified perspective view of an input device 30, in accordance with one embodiment of the present invention. The input device 30 is generally configured to send information or data to an electronic device (not shown) in order to perform an action on a display screen (e.g., via a graphical user interface (GUI)). For example, moving an input pointer, making a selection, providing instructions, etc. The input device may interact with the electronic device through a wired (e.g., cable/connector) or wireless connection (e.g., IR, bluetooth, etc.).

The input device 30 may be a stand alone unit or it may be integrated into the electronic device. When in a stand alone unit, the input device typically has its own enclosure. When integrated with an electronic device, the input device typically uses the enclosure of the electronic device. In either case, the input device may be structurally coupled to the enclosure as for example through screws, snaps, retainers, adhesives and the like. In some cases, the input device may be removably coupled to the electronic device as for example through a docking station. The electronic device to which the input device is coupled may correspond to any consumer related electronic product. By way of example, the electronic device may correspond to a computer such as a desktop computer, laptop computer or PDA, a media player such as a music player, a communication device such as a cellular phone, another input device such as a keyboard, and the like.

As shown in FIG. 2, the input device 30 includes a frame 32 (or support structure) and a track pad 34. The frame 32 provides a structure for supporting the components of the input device. The frame 32 in the form of a housing may also enclose or contain the components of the input device. The components, which include the track pad 34, may correspond to electrical, optical and/or mechanical components for operating the input device 30.

Track pad 34 provides an intuitive interface configured to provide one or more control functions for controlling various applications associated with the electronic device to which it is attached. By way of example, the touch initiated control function may be used to move an object or perform an action on the display screen or to make selections or issue commands associated with operating the electronic device. In order to implement the touch initiated control function, the track pad 34 may be arranged to receive input from a finger (or object) moving across the surface of the track pad 34 (e.g., linearly, radially, angular, etc.), from a finger holding a particular position on the track pad 34 and/or by a finger tapping on a particular position of the track pad 34. As should be appreciated, the touch pad 34 provides easy one-handed operation, i.e., lets a user interact with the electronic device with one or more fingers.

The track pad 34 may be widely varied. For example, the touch pad 34 may be a conventional track pad based on the Cartesian coordinate system, or the track pad 34 may be a touch pad based on a polar coordinate system. An example of a touch pad based on polar coordinates may be found in U.S. Pat. No. 7,046,230 to Zadesky et al., entitled "TOUCH PAD FOR HANDHELD DEVICE", filed Jul. 1, 2002, which is herein incorporated in its entirety by reference thereto.

The track pad 34 may be used in a relative or absolute mode. In absolute mode, the track pad 34 reports the absolute coordinates of where it is being touched. For example x, y in the case of the Cartesian coordinate system or (r, θ) in the case of the polar coordinate system. In relative mode, the track pad 34 reports the direction and/or distance of change. For example, left/right, up/down, and the like. In most cases, the signals produced by the track pad 34 direct motion on the display screen in a direction similar to the direction of the finger as it is moved across the surface of the track pad 34.

The shape of the track pad 34 may be widely varied. For example, the track pad 34 may be circular, oval, square, rectangular, triangular, and the like. In general, the outer perimeter of the track pad 34 defines the working boundary of the track pad 34. In the illustrated embodiment, the track pad is rectangular. Rectangular track pads are common on laptop computers.

The track pad 34, which generally takes the form of a rigid planar platform, includes a touchable outer track surface 36 for receiving a finger (or object) for manipulation of the track pad. Although not shown in FIG. 2, beneath the touchable outer track surface 36 is a sensor arrangement that is sensitive to such things as the pressure and/or motion of a finger thereon. The sensor arrangement typically includes a plurality of sensors that are configured to activate as the finger sits on, taps on or passes over them. In the simplest case, an electrical signal is produced each time the finger is positioned over a sensor. The number of signals in a given time frame may indicate location, direction, speed, and acceleration of the finger on the track pad 34, i.e., the more signals, the more the user moved his finger. In most cases, the signals are monitored by an electronic interface that converts the number, combination and frequency of the signals into location, direction, speed and acceleration information. This information may then be used by the electronic device to perform the desired control function on the display screen. The sensor arrangement may be widely varied. By way of example, the sensors may be based on resistive sensing, surface acoustic wave sensing, pressure sensing (e.g., strain gauge), infra red sensing, optical sensing, dispersive signal technology, acoustic pulse recognition, capacitive sensing and the like.

In the illustrated embodiment, the track pad 34 is based on capacitive sensing. A capacitively-based track pad is arranged to detect changes in capacitance as the user moves an object such as a finger around the track pad. In most cases, the capacitive track pad includes a protective shield, one or more electrode layers, a circuit board and associated electronics including an application specific integrated circuit (ASIC). The protective shield is placed over the electrodes; the electrodes are mounted on the top surface of the circuit board; and the ASIC is mounted on the bottom surface of the circuit board. The protective shield serves to protect the underlayers and to provide a surface for allowing a finger to slide thereon. The surface is generally smooth so that the finger does not stick to it when moved. The protective shield also provides an insulating layer between the finger and the electrode layers. The electrode layer includes a plurality of spatially distinct electrodes. Any suitable number of electrodes may be used. In most cases, it would be desirable to increase the number of electrodes so as to provide higher resolution, i.e., more information can be used for things such as acceleration.

Capacitive sensing works according to the principals of capacitance. As should be appreciated, whenever two electrically conductive members come close to one another without actually touching, their electric fields interact to form capacitance. In the configuration discussed above, the first electrically conductive member is one or more of the electrodes and the second electrically conductive member is, for example, the finger of the user. Accordingly, as the finger approaches the touch pad, a tiny capacitance forms between the finger and the electrodes in close proximity to the finger. The capacitance in each of the electrodes is measured by an ASIC located on the bottom (or backside) of the circuit board. By detecting changes in capacitance at each of the electrodes, the ASIC can determine the location, direction, speed and acceleration of the finger as it is moved across the touch pad. The ASIC can also report this information in a form that can be used by the electronic device.

In accordance with one embodiment, track pad 34 is movable relative to frame 32 so as to initiate another set of signals (other than just tracking signals). By way of example, track pad 34 in the form of the rigid planar platform may rotate, pivot, slide, translate, flex and/or the like relative to frame 32. Track pad 34 may be coupled to frame 32 and/or it may be movably restrained by frame 32. By way of example, track pad 34 may be coupled to frame 32 through screws, axels, pin joints, slider joints, ball and socket joints, flexure joints, magnets, cushions and/or the like. Track pad 34 may also float within a space of the frame (e.g., gimbal). It should be noted that the input device 30 may additionally include a combination of joints such as a pivot/translating joint, pivot/flexure joint, pivot/ball and socket joint, translating/flexure joint, and the like to increase the range of motion (e.g., increase the degree of freedom).

When moved, touch pad 34 is configured to actuate a circuit that generates one or more signals. The circuit generally includes one or more movement indicators such as switches, sensors, encoders, and the like. An example of a gimbaled track pad may be found in patent application Ser. No. 10/643,256, entitled, "MOVABLE TOUCH PAD WITH ADDED FUNCTIONALITY," filed Aug. 18, 2003, which is herein incorporated in its entirety by reference thereto.

Figure 3A:
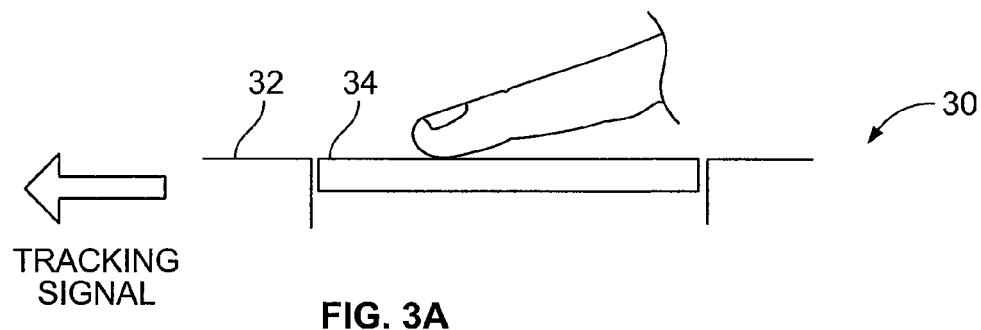
Figure 3B:
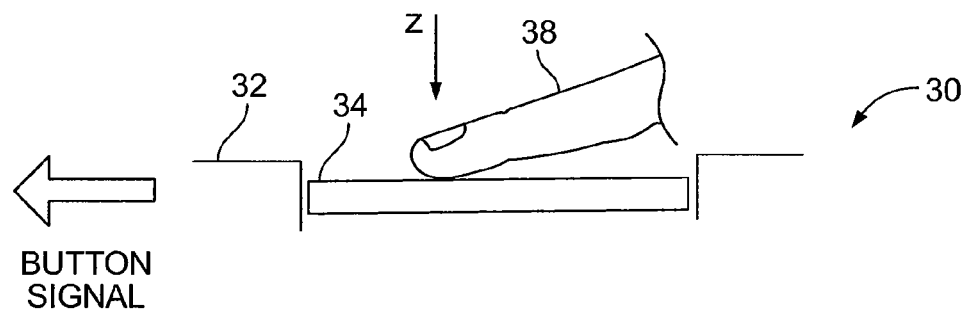
Figure 3C:
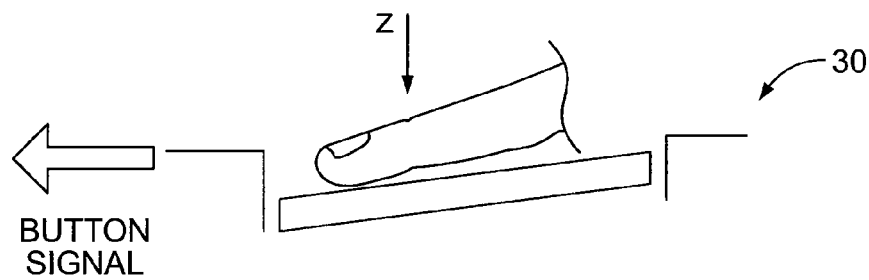

In the illustrated embodiment, track pad 34 takes the form of a depressible button that performs a "picking" action. That is, a portion of the entire track pad 34 acts like a single or multiple button such that one or more additional button functions may be implemented by pressing on track pad 34 rather than tapping on the track pad or using a separate button/separate zone. As shown in FIGS. 3A and 3B, according to one embodiment of the invention, track pad 34 is capable of moving between an upright (or neutral) position (FIG. 3A) and a depressed (or activate) position (FIG. 3B) when a force from a finger 38, palm, hand, or other object is applied to the track pad 34. The force should not be so small as to allow for accidental activation of the button signal, but not so large as to cause user discomfort by requiring undue pressure. Track pad 34 is typically biased in the upright position as for example through a flexure hinge, a spring member, or magnets. Track pad 34 moves to the activate position when the bias is overcome by an object pressing on track pad 34. As shown in FIG. 3C, the track pad 34 may be pivoted at one end such that the activate position is slightly inclined with respect to the neutral position. When the finger (or other object) is removed from track pad 34, the biasing member urges it back towards the neutral position. A shim, shock absorber, upstop or other structure (not shown) may prevent track pad 34 from overshooting the neutral position as it returns. For example, a portion of frame 32 may extend outwardly above a portion of track pad 34 so as to stop track pad 34 at the neutral position. In this way, the track surface can be kept flush with frame 32 if desired. For example, in laptop computers or handheld media devices, it may be desirable to have the track pad flush with the housing of the computer or device.

Figure 3D:
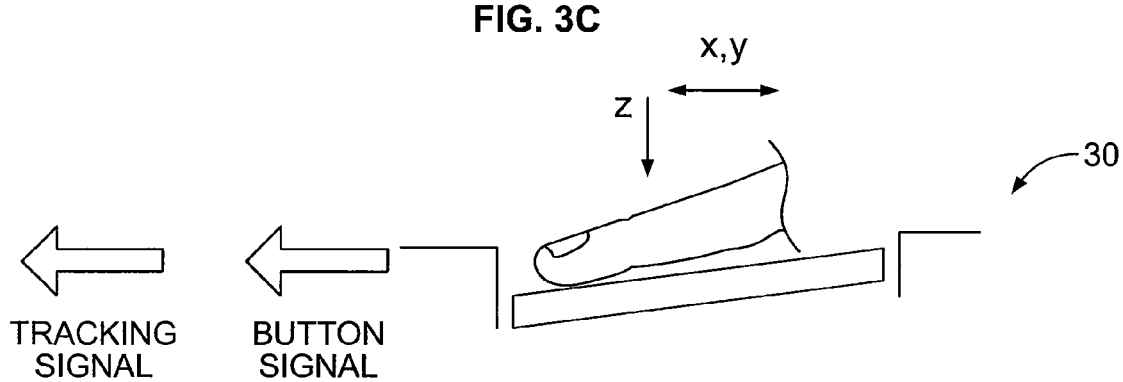

As shown in FIG. 3A, in the upright/neutral position, track pad 34 generates tracking signals when an object such as a user's finger is moved over the top surface of the touch pad in the x,y plane. Although FIG. 3A depicts the neutral position as being upright, the neutral position may be situated at any orientation. As shown in FIG. 3B, in the depressed position (z direction), track pad 34 generates one or more button signals. The button signals may be used for various functionalities including but not limited to making selections or issuing commands associated with operating an electronic device. By way of example, in the case of a music player, the button functions may be associated with opening a menu, playing a song, fast forwarding a song, seeking through a menu and the like. In the case of a laptop computer, the button functions can be associated with opening a menu, selecting text, selecting an icon, and the like. As shown in FIG. 3D, input device 30 may be arranged to provide both the tracking signals and the button signal at the same time, i.e., simultaneously depressing the touch pad 34 in the z direction while moving tangentially along the track surface (i.e., in the x, y directions). In other cases, input device 30 may be arranged to only provide a button signal when touch pad 34 is depressed and a tracking signal when the touch pad 34 is upright.

To elaborate, track pad 34 is configured to actuate one or more movement indicators, which are capable of generating the button signal when track pad 34 is moved to the activate position. The movement indicators are typically located within frame 32 and may be coupled to track pad 34 and/or frame 32. The movement indicators may be any combination of switches and sensors. Switches are generally configured to provide pulsed or binary data such as activate (on) or deactivate (off). By way of example, an underside portion of track pad 34 may be configured to contact or engage (and thus activate) a switch when the user presses on track pad 34. The sensors, on the other hand, are generally configured to provide continuous or analog data. By way of example, the sensor may be configured to measure the position or the amount of tilt of touch pad 34 relative to the frame when a user presses on the track pad 34. Any suitable mechanical, electrical and/or optical switch or sensor may be used. For example, tact switches, force sensitive resistors, pressure sensors, proximity sensors and the like may be used.

Track pads 10 and 30 shown in FIGS. 1-3 may, in some embodiments, be multi-touch trackpads. Multi-touch consists of a touch surface (screen, table, wall, etc.) or touchpad, as well as software that recognizes multiple simultaneous touch points, as opposed to the standard touchscreen (e.g., computer touchpad, ATM), which recognizes only one touch point. This effect is achieved through a variety of means, including but not limited to: capacitive sensing, resistive sensing, surface acoustic wave sensing, heat, finger pressure, high capture rate cameras, infrared light, optic capture, tuned electromagnetic induction, and shadow capture. An example of a multi-touch mobile phone is the iPhone produced by Apple Inc. of Cupertino, Calif. An example of a multi-touch media device is the iPod Touch produced by Apple Inc. Examples of laptop computers having multi-touch track pads are the MacBook Air and MacBook Pro produced by Apple Inc. All of the input devices described herein may employ multi-touch technology in some embodiments; alternatively the input devices described herein may employ single touch track pads.

FIG. 4 is a simplified block diagram of a computing system 39, in accordance with one embodiment of the present invention. The computing system generally includes an input device 40 operatively connected to a computing device 42. By way of example, the input device 40 may generally correspond to the input device 30 shown in FIGS. 2 and 3, and the computing device 42 may correspond to a laptop computer, desktop computer, PDA, media player, mobile phone, smart phone, video game or the like. As shown, input device 40 includes a depressible track pad 44 and one or more movement indicators 46. Track pad 44 is configured to generate tracking signals and movement indicator 46 is configured to generate a button signal when the track pad 44 is depressed. Although track pad 44 may be widely varied, in this embodiment, track pad 44 includes capacitance sensors 48 and a control system 50 for acquiring the position signals from sensors 48 and supplying the signals to computing device 42. Control system 50 may include an application specific integrated circuit (ASIC) that is configured to monitor the signals from sensors 48, to compute the location (Cartesian or angular), direction, speed and acceleration of the monitored signals and to report this information to a processor of computing device 42. Movement indicator 46 may also be widely varied. In this embodiment, however, movement indicator 46 takes the form of a switch that generates a button signal when track pad 44 is depressed. Switch 46 may correspond to a mechanical, electrical or optical style switch. In one particular implementation, switch 46 is a mechanical style switch that includes a protruding actuator 52 that may be pushed by track pad 44 to generate the button signal. By way of example, the switch may be a tact switch or tactile dome.

Both track pad 44 and switch 46 are operatively coupled to computing device 42 through a communication interface 54. The communication interface provides a connection point for direct or indirect connection between the input device and the electronic device. Communication interface 54 may be wired (wires, cables, connectors) or wireless (e.g., transmitter/receiver).

Computing device 42 generally includes a processor 55 (e.g., CPU or microprocessor) configured to execute instructions and to carry out operations associated with the computing device 42. For example, using instructions retrieved for example from memory, the processor may control the reception and manipulation of input and output data between components of the computing device 42. In most cases, processor 55 executes instruction under the control of an operating system or other software. Processor 55 can be a single-chip processor or can be implemented with multiple components.

Computing device 42 also includes an input/output 110 controller 56 that is operatively coupled to processor 55. I/O controller 56 may be integrated with processor 55 or it may be a separate component, as shown. I/O controller 56 is generally configured to control interactions with one or more I/O devices that can be coupled to computing device 42, for example, input device 40. I/O controller 56 generally operates by exchanging data between computing device 42 and I/O devices that desire to communicate with computing device 42.

Computing device 42 also includes a display controller 58 that is operatively coupled to processor 55. Display controller 58 may be integrated with processor 55 or it may be a separate component, as shown. Display controller 58 is configured to process display commands to produce text and graphics on a display screen 60. By way of example, display screen 60 may be a monochrome display, color graphics adapter (CGA) display, enhanced graphics adapter (EGA) display, variable-graphics-array (VGA) display, super VGA display, liquid crystal display (LCD) (e.g., active matrix, passive matrix and the like), cathode ray tube (CRT), plasma displays, backlit light-emitting diode (LED) LCD displays, or the like.

In one embodiment (not shown), track pad 44 can comprise a glass surface functioning not only as a touch-sensitive surface, but also as a display screen; in this case display screen 60 shown in FIG. 4 would be integrated with the glass surface of the track pad 44. This could be useful in computing devices (e.g., media players or mobile phones) having touch sensitive displays. An example of a media player having a touch sensitive display is the iPod Touch produced by Apple Inc. of Cupertino Calif. An example of a mobile phone having a touch sensitive display is the iPhone produced by Apple Inc. of Cupertino Calif.

In most cases, processor 55 together with an operating system operates to execute computer code and produce and use data. The computer code and data may reside within a program storage area 62 that is operatively coupled to processor 55. Program storage area 62 generally provides a place to hold data that is being used by computing device 42. By way of example, the program storage area may include Read-Only Memory (ROM), Random-Access Memory (RAM), hard disk drive and/or the like. The computer code and data could also reside on a removable program medium and loaded or installed onto the computing device when needed. In one embodiment, program storage area 62 is configured to store information for controlling how the tracking and button signals generated by input device 40 are used by computing device 42.

FIG. 5 shows one embodiment of an input device, generally shown at 70, comprising a track pad 72 connected to a frame 76. Frame 76 may be a housing for a stand alone input device, or it may be a casing for another device which incorporates track pad 72, for example a laptop computer, desktop computer, hand held media device, PDA, mobile phone, smart phone, etc. Track pad 72 includes various layers including an outer touch-sensitive track surface 74 for tracking finger movements. Track surface 74 may also provide a low friction cosmetic surface. In one embodiment, track pad 72 is based on capacitive sensing; therefore, it includes an electrode layer 80, which, for example, may be implemented on a PCB. In the case of capacitive sensing, track surface 74 is a dielectric material. A stiffener 84 is located below electrode layer 80. Stiffener 84 is shown in FIG. 5 and FIG. 6, but in some embodiments may be omitted. Stiffener 84 may be used to compensate for the inherent flexibility of electrode layer 80. Electrode layer 80 responds to finger movements along track surface 74 by sending signals to sensor 82. In the case of capacitive sensing, electrode layer 80 registers changes in capacitance based on finger movements and sensor 82 is a capacitive sensor. In this way, track pad 72 incorporates a touch sensor arrangement. Sensor 82 is shown disposed on the bottom of electrode layer 80, but it may be located elsewhere in other embodiments. If, as in the illustrated embodiment, sensor 82 is located on a movable part of track pad 72, the input device may incorporate a flexible electrical connection (not shown) capable of moving with the system.

A movement indicator 78 is disposed on the bottom of track pad 72. Movement indicator 78 may be widely varied, however, in this embodiment it takes the form of a mechanical switch, which is typically disposed between the track pad 72 and the frame 76. In other embodiments, movement indicator 78 may be a sensor, for example an electrical sensor. Movement indicator 78 may be attached to frame 76 or to track pad 72. In the illustrated embodiment, movement indicator 78 is attached to the bottom side of electrode layer 80. By way of example, if electrode layer 80 is located on a PCB, movement indicator 78 may be located on the bottom of the PCB. In another example, movement indicator 78 may tack the form of a tact switch and more particularly, may be an SMT dome switch (dome switch packaged for SMT).

Track pad 72 is shown in its neutral position in FIG. 5, where movement sensor 78 is not in contact with frame 76. When a user applies a downward pressure to track surface 74, track pad 72 may move downward causing movement sensor 78 to register this change in position. In the illustrated embodiment, movement sensor 78 (a tact switch) would contact either frame 76, or in this case set screw 88. Set screw 88 may be manually adjusted to alter the distance between the neutral and activate positions. In one embodiment (not shown), set screw 88 may directly abut movement sensor 78 in the neutral position, such that there is no slack or pre-travel in the system. A flexure hinge 86 connects track pad 72 with frame 76. Flexure hinge 86 is a resilient material that flexes when a force is applied, but exerts a restoring force so as to urge track pad 72 back towards the neutral position. In one embodiment, flexure hinge 86 may be thin spring steel.

As shown in FIG. 6, flexure hinge 86 will flex when a user pushes down on track surface 74. Flexure 86 also urges track pad 72 towards its neutral position, which in the illustrated embodiment shown in FIG. 5 is horizontal. In this way, a user can press down virtually anywhere on track surface 74 and cause a "pick," meaning that movement indicator 78 will register this depression. This is in contrast to prior track pads which incorporate separate track zones and pick zones. Being able to pick anywhere on track surface 74 will provide the user with a more intuitive and pleasurable interface. For example, a user may be able to generate tracking and button signals with a single finger without ever having to remove the finger from track surface 74. In contrast, a user operating a track pad with separate track and pick zones may, for example, use a right hand for tracking and a left hand for picking, or a forefinger for tracking and a thumb for picking.

A shoulder 90, which may be an extension of frame 76 or a discreet member, blocks track pad 72 from traveling past its neutral position by contacting a part of track pad 72, for example stiffener 84. In this way, track surface 74 may be kept substantially flush with a top surface of frame 76. There may be a shock absorber or upstop (not shown) incorporated in conjunction with shoulder 90 to cushion contact between track pad 72 and shoulder 90.

As should be appreciated, the pick generated by pressing on track surface 74 may include selecting an item on the screen, opening a file or document, executing instructions, starting a program, viewing a menu, and/or the like. The button functions may also include functions that make it easier to navigate through the electronic system, as for example, zoom, scroll, open different menus, home the input pointer, perform keyboard related actions such as enter, delete, insert, page up/down, and the like.

Flexure hinge 86 allows for a movable track pad in the minimum vertical space possible. Minimum vertical space is achieved because flexure hinge 86 is thin and is generally situated parallel to a bottom layer of track pad 72, consequently, flexure hinge 86 does not appreciably add to the thickness of track pad 72. Therefore, this arrangement is feasible for use in ultrathin laptop computers (or other ultrathin devices). In such ultrathin laptop computer applications, vertical space is extremely limited. In the past, the size of electrical components was often the limiting feature as to how small electrical devices could be made. Today, electrical components are increasingly miniaturized, meaning that mechanical components (e.g., movable track pads) may now be the critical size-limiting components. With this understanding, it is easy to appreciate why linear-actuation (e.g., supporting a movable track pad by coil springs or the like) is not ideal in some applications. Furthermore, using springs may add unnecessary complexity (increased part count, higher cost, higher failure rates, etc. . . . ) to the manufacturing process. Another disadvantage of springs is that in some embodiments springs may mask or compromise the tactile switch force profile. In contrast, flexure 86 can deliver a substantially consistent feel across track surface 74, and give the user a more faithful representation of the tactile switch force profile.

Referring now to FIG. 6, according to one embodiment of the present invention, when a user presses on track surface 74 of track pad 72, track pad 72 pivots downwardly and activates switch 78 disposed underneath. When activated, switch 78 generates button signals that may be used by an electronic device connected to input device 70. Flexure 86 can constrain track pad 72 to move substantially about only one axis. This can be accomplished by, for example, using multiple flexures arranged along an axis on one side of track pad 72, such as the rear side. Furthermore, if track pad 72 is made stiff (for example, by inclusion of stiffener 84 if necessary), a leveling architecture is achieved. The coupling of a stiff track pad 72 to flexure hinge 86 allows track pad 72 to remain level when articulated off-center.

FIG. 7 and FIG. 8 show an input device 100, in accordance with one embodiment of the present invention. FIG. 7 is a perspective view of an input device 100 shown in use with a laptop computer. FIG. 8 is an exploded perspective view of a disassembled track pad 101 used in input device 100.

Input device, shown generally at 100 in FIG. 7 is a depressible touch-sensitive track pad 101 disposed in a laptop computer frame 104. As installed in computer frame 104, the only portion of input device 100 visible to the user is track surface 102, which may be flush with computer frame 104. In the illustrated embodiment, track surface 102 is glass. Glass provides a dielectric, low-friction, durable, cosmetic surface. In one embodiment, track surface 102 is made of slightly frosted glass. In other embodiments, track surface 102 may be ceramic, plastic, or the like. If input device 100 is based on capacitive sensing, track surface 102 must be a dielectric material. The front end (i.e., nearest the user) of track surface 102 has a mid point 201 and a corner 203. Track surface 102 moves approximately 0.2 mm when picked at the mid point of the extreme front end 201. Due to the leveling architecture and stiffness of the illustrated embodiment, track surface 102 moves only approximately 0.4 mm when picked in the extreme left or right corner of the front end 203, making input device 100 suitable for use with ultrathin laptops or other ultrathin applications where a depressible track pad is desirable.

As best seen in FIG. 8, immediately below glass 102 is a layer of ink 106. Ink 106 is for cosmetic purposes, and may be color-matched to the color of computer frame 104. Alternatively, ink 106 may be a different color than computer frame 104, for example, a different shade of a similar color or a contrasting color. A layer of pressure-sensitive adhesive (PSA) 108 attaches glass 102 to the top surface of PCB 110. A second layer of PSA 112 attaches the bottom surface of PCB 110 to the top surface of stiffener 114.

In the illustrated embodiment, PSA layers 110 and 112 are shown as sheets shaped to match with the adjacent layers 106, 110, and 114. Modifications can be made, for example cutting holes in layers 110 and 112 to accommodate rigid posts or epoxy glue or the like in order to control shear between adjacent layers. Alternatively, PSA layers 110 and 112 can be cut back at their perimeters in order to make room for an entire perimeter of glue. These modifications may strengthen the bond between adjacent layers when subjected to high shear loads. PSA is described herein by way of example; other means of attaching layers could be used, for example, double-sided tape, glue, or cement.

PCBs generally have some inherent flex to them, which stiffener 114 substantially corrects for in order to add rigidity to track pad 101. Stiffener 114 may have cutouts 116a to selectively reduce its weight, and or to selectively adjust its stiffness. Other cutouts, for example 118a, not only serve to reduce weight (or to modulate stiffness) but also to allow electrical contact between PCB 110 and sensors incorporated on flex 120, as will be discussed below. Overlying PSA layer 112 has corresponding cutouts 116b and 118b.

In general, stiffener 114 should be stiff, light (i.e., low density), and thin enough for use in space-sensitive applications (e.g., ultrathin laptops, media devices, mobile phones, smart phones or the like). An ideal stiffener would be very stiff, very light, while at the same time very stiff. However, these three qualities (stiffness, light weight, thin) can be considered as tradeoffs; for example, there is generally a tradeoff between stiffness and weight for a given material. In the illustrated embodiment, stiffener 114 is made of steel. Steel is a compromise material because it is moderately heavy, but is very stiff. Because of its high stiffness, a stiffener 114 constructed of steel can be made relatively thin. Other metals may be used, for example, aluminum or titanium. Titanium is very light but may be more expensive than steel.

In other embodiments clad stiffeners may be used, in particular clad metallic stiffeners formed from various metals or other materials. An exemplary clad metallic stiffener 115 is shown in FIG. 9 consisting of, for example, an aluminum core 117 surrounded by an upper steel layer 119 and a lower steel layer 121. Steel has a higher elastic modulus (also known as modulus of elasticity) than inner core 117 of aluminum. An elastic modulus is the mathematical description of an object or substance's tendency to be deformed elastically (i.e., non-permanently) when a force is applied to it. A material with a higher elastic modulus (e.g., steel) is stiffer than a material with a lower elastic modulus (e.g. aluminum). This is important because, under certain conditions, the deflection of a stiffener is inversely proportional to the product of the elastic modulus and the second moment of area. This means that a stiffener made exclusively of aluminum of the same size and shape as stiffener 115, which has an aluminum core and steel outer layers, would be lighter but would not be as stiff.

The clad effect (i.e., increasing stiffness by using high modulus materials as outer layers on a lightweight core) is similar to what happens with I-beams in constructing buildings; but in I-beams the second moment of area is adjusted instead of the elastic modulus. This is why beams with higher area moments of inertia, such as I-beams, are so often seen in building construction as opposed to other beams with the same area.

In other embodiments, stiffeners can be made of any suitable structural material, including but not limited to glass, ceramics, tungsten carbide, carbon fiber composites, and metal matrix composites. Such structural materials are very light and thin, making them desirable for use as stiffeners in thin, lightweight portable electronic devices.

PCB 110 includes an electrode layer (not shown) on the top surface and a movement sensor 126 on the bottom surface. In the illustrated embodiment, movement sensor 126 is a mechanical switch (see FIGS. 8 and 11). Movement sensor 126 may be widely varied. Generally, tact switches may be used. More particularly, it may be a bare, packaged or encased metal dome switch. When a user presses down on track surface 102, flexure hinge 122 allows for displacement of track pad 101, thereby allowing movement sensor 126 to contact set screw 128. Since switch 126 is electrically connected to other parts of the system (e.g., it is mounted on PCB 110), a pick signal will be registered and processed each time the user presses down sufficiently far to actuate sensor 126.

Set screw 128 can be adjusted to increase or completely eliminate any offset displacement from movement sensor 126 in the neutral position. As shown in FIG. 11, there may be a small offset between movement sensor 126 and set screw 128 in the neutral position. In another embodiment (not shown), set screw 128 may directly abut switch 126 in the neutral position.

Flexure 122 will now be discussed with reference to FIGS. 8, 10, and 12. In the illustrated embodiment, two flexures 122 are attached along a side of track pad 101 opposite sensor 126. This arrangement constrains track pad 101 to move generally as a pivot about an axis defined by the location of the flexures 122. The physical separation of the flexures 122 help to establish a leveling architecture. However, some amount of twist about a perpendicular axis (e.g., an axis on the midline of the track surface and perpendicular to the axis defined by the location of flexures 122) will also be possible if a user presses down on track surface 102 off center. This twist is partly from inherent flexibility in track pad 101 (even if stiffener 114 is used) and partly from variable bending of flexures 122. This twist could be at least partially compensated by, for example, a more robust stiffener and/or using more or stiffer flexures. As previously mentioned, in the illustrated embodiment, track surface 102 moves approximately 0.4 mm when pressed off center (e.g., at corner 203 in FIG. 7) and only approximately 0.2 mm when pressed on its centerline (e.g., at 201 in FIG. 7). This extremely small amount of twist does not degrade the performance of track pad 101.

Flexure 122 has a top flexure portion 130 and a bottom flexure stiffener portion 132. Flexure portion 130 may be made of a thin resilient material, for example thin spring steel. When a flexible component is subject to bending stress, an instability can occur that manifests itself as a buckling. To relieve this instability, flexure members 130 have slots 134, generally oriented substantially parallel to the axis about which they are most likely to be bent. Flexure stiffeners 132 stiffen flexures 122 in the area where they are attached to frame 104. In the illustrated embodiment, each flexure 122 has three fasteners 136 which thread through holes 136a in flexure member 130 and holes 136b in stiffener 114. In the illustrated embodiment, each flexure 122 also has two more rear fasteners 138 which thread through holes 138a in flexure 122 and 138b in frame 104 to secure flexures 122 to frame 104. While three fasteners 136 and two rear fasteners 138 are shown, the type and number of fasteners can be varied.

As shown in FIGS. 8 and 13, two upstops 140 are positioned above extensions 146 of stiffener 114 and below an extension or shoulder of frame 104. This arrangement prevents track pad 101 from overshooting the neutral position after a depression cycle, maintaining track surface 102 substantially flush with a surface of frame 104. PSA 144 can be used to attach upstop 140 to frame 104. Alternatively, PSA 144 can be used to attach upstop 140 to stiffener 114. After a depression cycle, flexures 122 urge track pad 101 back towards the neutral position. In the illustrated embodiment, extensions 146 of stiffener 114 come into contact with upstop 140, which is positioned underneath frame 104. Upstop 140 acts as a mild shock absorber, preventing stiffener 114 from actually contacting frame 104, which may be substantially rigid. Suitable materials for upstop 140 include plastic, foam, rubber, biaxially-oriented polyethylene terephthalate (boPET) polyester film, which is known by the trade mark Mylar®, and the like. By absorbing the impact between stiffener 114 and frame 104 when the track pad 101 rebounds to neutral, Upstop 140 can selectively dampen undesirable acoustic noise after a depression cycle. Upstop 140 serves the dual function of shock absorption and limiting an upper range of motion of track pad 101 to coincide with the neutral position, which may be substantially flush with frame 104. While two upstops 140 are shown, more or fewer may be used.

Flex 120 can best be seen in FIGS. 8 and 14. Since track pad 101 is movable, flex 120 must be able to travel with track pad 101 as it moves. This is accomplished by providing a flexible electrical connection 150, which runs between a computer connection 152 configured to communicate with the electronic device in which input device 100 is housed in, for example a laptop computer, and a sensor connection 154 configured to communicate with PCB 110. Integrated circuits 156 are located on the top surface of flex 120. Integrated circuits 156 receive and process data from the electrode layer on PCB 110 to form the heart of a capacitive sensor, providing functions such as reading when a user's finger, for example, is in contact with track surface 102, and for determining finger movement. A PCB-based sensor is discussed by way of example, and not by way of limitation. Non-PCB sensors such as stamped sheetmetal, flex circuits (e.g., polyimide), conductive ink printed on substrates, e.g., polyethylene terephthalate (PET) substrates, indium tin oxide (ITO) on glass, and the like can also be used in the present invention. A cosmetic label 124 covers flex 120 from below. The assembled input device 100 is seen from below in FIG. 10.

Although not shown, input device 100 may be back lit. For example, PCB 110 can be populated with light emitting diodes (LEDs) on either side to enable a user to more easily see input device 100 in low light.

The input devices described herein may be intergrated into an electric device or they may be separate stand alone devices. One example of an input device integrated into a laptop computer is shown in FIG. 7 and previously discussed; FIG. 15 shows an input device 200 integrated into a media player 202 while FIG. 16 shows an input device 207 integrated into a mobile phone. FIGS. 17 and 18, on the other hand, show some implementations of input device 200 as a stand alone unit. In FIG. 17, input device 200 is a peripheral device that is connected to a desktop computer 206. In FIG. 18, the input device 200 is a remote control that wirelessly connects to a docking station 208 with a media player 210 docked therein. It should be noted, however, that remote control 200 can also be configured to interact with media player 210 (or other electronic device) directly thereby eliminating the need for a docking station. An example of a docking station for a media player with which the present invention may be used can be found in U.S. patent application Ser. No. 10/423,490, "MEDIA PLAYER SYSTEM," filed Apr. 25, 2003, which is herein incorporated in its entirety by reference thereto. It should be noted that these particular embodiments are not a limitation and that many other devices and configurations may be used.

Referring to FIG. 15, the media player 202 will be discussed in greater detail. The term "media player" generally refers to computing devices that are dedicated to processing media such as audio, video or other images, as for example, music players, game players, video players, video recorders, cameras, and the like. In some cases, the media players contain single functionality (e.g., a media player dedicated to playing music) and in other cases the media players contain multiple functionality (e.g., a media player that plays music, displays video, stores pictures and the like). In either case, these devices are generally portable so as to allow a user to listen to music, play games or video, record video or take pictures wherever the user travels.

In one embodiment, the media player is a handheld device that is sized for placement into a pocket of the user. By being pocket sized, the user does not have to directly carry the device and therefore the device can be taken almost anywhere the user travels (e.g., the user is not limited by carrying a large, bulky and often heavy device, as in a laptop or notebook computer). For example, in the case of a music player, a user may use the device while working out at the gym. In case of a camera, a user may use the device while mountain climbing. In the case of a game player, the user can use the device while traveling in a car. Furthermore, the device may be operated by the users hands, no reference surface such as a desktop is needed. In the illustrated embodiment, the media player 202 is a pocket sized hand held MP3 music player that allows a user to store a large collection of music (e.g., in some cases up to 40,000 CD-quality songs). By way of example, the MP3 music player may correspond to one of the iPod family of MP3 players manufactured by Apple Inc. of Cupertino, Calif. Although used primarily for storing and playing music and/or video, the MP3 music player shown herein may also include additional functionality such as storing a calendar and phone lists, storing and playing games, storing photos and the like. In fact, in some cases, it may act as a highly transportable storage device.

As shown in FIG. 15, the media player 202 includes a housing 222 that encloses internally various electrical components (including integrated circuit chips and other circuitry) to provide computing operations for the media player 202. In addition, the housing 222 may also define the shape or form of the media player 202. That is, the contour of the housing 222 may embody the outward physical appearance of the media player 202. The integrated circuit chips and other circuitry contained within the housing 222 may include a microprocessor (e.g., CPU), memory (e.g., ROM, RAM), a power supply (e.g., battery), a circuit board, a hard drive, other memory (e.g., flash) and/or various input/output (I/O) support circuitry. The electrical components may also include components for inputting or outputting music or sound such as a microphone, amplifier and a digital signal processor (DSP). The electrical components may also include components for capturing images such as image sensors (e.g., charge coupled device (CCD) or complimentary oxide semiconductor (CMOS)) or optics (e.g., lenses, splitters, filters).

In the illustrated embodiment, the media player 202 includes a hard drive thereby giving the media player massive storage capacity. For example, a 160 GB hard drive can store up to 40,000 songs, approximately 200 hours of video, or up to 25,000 photos. In contrast, flash-based media players on average store up to 128 MB, or about two hours, of music. The hard drive capacity may be widely varied (e.g., 8, 16, 80, 160 GB, etc.). In addition to the hard drive, the media player 202 shown herein also includes a battery such as a rechargeable lithium ion battery. These type of batteries are capable of offering about 30 hours of continuous music playtime to the media player or 5 hours of video playtime.

The media player 202 also includes a display screen 224 and related circuitry. The display screen 224 is used to display a graphical user interface as well as other information to the user (e.g., text, objects, graphics). By way of example, the display screen 224 may be a liquid crystal display (LCD). In one particular embodiment, the display screen corresponds to a 320-by-240-pixel high-resolution display LCD display, with LED backlight to give clear visibility in daylight as well as low-light conditions. As shown, the display screen 224 is visible to a user of the media player 202 through an opening 225 in the housing 222, and through a transparent wall 226 that is disposed in front of the opening 225. Although transparent, the transparent wall 226 may be considered part of the housing 222 since it helps to define the shape or form of the media player 202.

The media player 202 also includes the touch pad 200 such as any of those previously described. The touch pad 200 generally consists of a touchable outer surface 231 for receiving a finger for manipulation on the touch pad 230. In the illustrated embodiment, touch pad 200 is circular, but its shape can be widely varied, e.g., rectangular, square, etc. Although not shown in FIG. 15, beneath the touchable outer surface 231 is a sensor arrangement. The sensor arrangement includes a plurality of sensors that are configured to activate as the finger sits on, taps on or passes over them. In the simplest case, an electrical signal is produced each time the finger is positioned over a sensor. The number of signals in a given time frame may indicate location, direction, speed and acceleration of the finger on the touch pad, i.e., the more signals, the more the user moved his or her finger. In most cases, the signals are monitored by an electronic interface that converts the number, combination and frequency of the signals into location, direction, speed and acceleration information. This information may then be used by the media player 202 to perform the desired control function on the display screen 224. For example, a user may easily scroll through a list of songs by swirling the finger around the touch pad 200.

In addition to above, the touch pad may also include a movable button configured to provide one or more dedicated control functions for making selections or issuing commands associated with operating the media player 202. By way of example, in the case of an MP3 music player, the button functions may be associated with opening a menu, playing a song, fast forwarding a song, seeking through a menu, making selections and the like. In most cases, the button functions are implemented via a mechanical clicking action.

The position of the touch pad 200 relative to the housing 222 may be widely varied. For example, the touch pad 200 may be placed at any external surface (e.g., top, side, front, or back) of the housing 222 that is accessible to a user during manipulation of the media player 202. In most cases, the touch sensitive surface 231 of the touch pad 200 is completely exposed to the user. In the illustrated embodiment, the touch pad 200 is located in a lower, front area of the housing 222. Furthermore, the touch pad 230 may be recessed below, level with, or extend above the surface of the housing 222. In the illustrated embodiment, the touch sensitive surface 231 of the touch pad 200 is substantially flush with the external surface of the housing 222.

The shape of touch pad 200 may also be widely varied. Although shown as circular, the touch pad may also be annular, rectangular, triangular, and the like.

Media player 202 may also include a hold switch 234. The hold switch 234 is configured to activate or deactivate the touch pad and/or buttons associated therewith. This is generally done to prevent unwanted commands by the touch pad and/or buttons, as for example, when the media player is stored inside a user's pocket. When deactivated, signals from the buttons and/or touch pad are not sent or are disregarded by the media player. When activated, signals from the buttons and/or touch pad are sent and therefore received and processed by the media player.

Moreover, the media player 202 may also include one or more headphone jacks 236 and one or more data ports 238. The headphone jack 236 is capable of receiving a headphone connector associated with headphones configured for listening to sound being outputted by the media device 202. The data port 238, on the other hand, is capable of receiving a data connector/cable assembly configured for transmitting and receiving data to and from a host device such as a general purpose computer (e.g., desktop computer, portable computer). By way of example, the data port 238 may be used to upload or down load audio, video and other images to and from the media device 202. For example, the data port may be used to download songs and play lists, audio books, ebooks, photos, and the like into the storage mechanism of the media player.

The data port 238 may be widely varied. For example, the data port may be a PS/2 port, a serial port, a parallel port, a USB port, a Firewire port and/or the like. In some cases, the data port 238 may be a radio frequency (RF) link or optical infrared (IR) link to eliminate the need for a cable. Although not shown in FIG. 12, the media player 202 may also include a power port that receives a power connector/cable assembly configured for delivering powering to the media player 202. In some cases, the data port 238 may serve as both a data and power port. In the illustrated embodiment, the data port 238 is a Firewire port having both data and power capabilities.

Although only one data port is shown, it should be noted that this is not a limitation and that multiple data ports may be incorporated into the media player. In a similar vein, the data port may include multiple data functionality, i.e., integrating the functionality of multiple data ports into a single data port. Furthermore, it should be noted that the position of the hold switch, headphone jack and data port on the housing may be widely varied. That is, they are not limited to the positions shown in FIG. 15. They may be positioned almost anywhere on the housing (e.g., front, back, sides, top, bottom), or even be absent in some embodiments. For example, the data port may be positioned on the bottom surface of the housing rather than the top surface as shown.

Referring back FIG. 16, mobile phone 207 will be discussed in greater detail. Phone 207 may be a smart phone. Mobile phone 207 comprises a frame 209 and a touch sensitive screen 211. Touch-sensitive screen 211, which may be a multi-touch screen, similar to that used on the iPhone produced by Apple Inc. of Cupertino, Calif. can be made clickable by allowing it to displace relative to frame 209 when pressed on. In this way a button functionality like the previously described depressible input devices of the present invention can be incorporated to phone 207. In some embodiments, tactile and/or aural feedback may be incorporated with the button function. For example, pressing down on screen 211 not only activates some function, but may also produce an audible clicking sound. The clicking sound may be mechanically produced (for example by the mechanical switch itself) and/or may be electrically produced (for example through a speaker which is activated whenever the user presses down far enough). Moreover, tactile feedback can be generated, for example the mechanical feedback generated by positively clicking a mechanical switch or a vibration which is triggered whenever a pick is detected. Although specifically discussed with reference to mobile phone 207, tactile and/or aural feedback may be incorporated with the button function of any embodiment discussed herein (e.g., laptop track pad, media player track pad or screen, remote control track pad, etc. . . . )

In another embodiment (not shown) a mobile phone can incorporate a non-touch sensitive screen (i.e., a traditional screen) in conjunction with a touch-sensitive, depressible track pad, such as the track pads previously described herein. In this embodiment, the screen functions as the display, while the track pad can, for example, move a cursor on the display and also incorporate a button function. In other words, a depressible track pad can be used on a mobile phone in conjunction with a separate screen instead of depressing the screen itself, as was the case with the embodiment discussed in reference to FIG. 16.

Turning to FIG. 19, a simplified block diagram of a remote control 280 incorporating an input device 282 therein, in accordance with another embodiment of the present invention is shown. By way of example, input device 282 may correspond to any of the previously described input devices of the present invention. Input device 282 includes a touch pad 284 and switch 286. Touch pad 284 and switch 286 are operatively coupled to a wireless transmitter 288, configured to transmit information over a wireless communication link so that an electronic device having receiving capabilities may receive the information over the wireless communication link. The wireless transmitter 288 may be widely varied. For example, it may be based on wireless technologies such as FM, RF, Bluetooth, 802.11 UWB (ultra wide band), infrared (IR), magnetic link (induction) and/or the like. In the illustrated embodiment, the wireless transmitter 288 is based on IR. IR generally refers wireless technologies that convey data through infrared radiation. As such, the wireless transmitter 288 generally includes an IR controller 290. The IR controller 290 takes the information reported from the touch pad 284 and switches 286 and converts this information into infrared radiation as for example using a light emitting diode 292.

As previously noted, the track surface of the present invention may be made of glass. Besides providing a low friction, durable, cosmetic surface, glass provides for options that opaque surfaces (e.g., plastic, ceramic, and the like) do not provide. For example, in one embodiment, track pad 101 can be delineated into separate zones, using, for example, lights, textured glass, or combinations thereof. Each zone can have a different function. For example, one zone may be a track zone (which may move a cursor) while another zone may be a pick zone (which may be depressible to activate a button function.)

FIGS. 20a-20e show exemplary delineation options for track pad 300. FIG. 20a shows transparent or semi-transparent track pad 300 made of glass with a single zone 302, i.e., the entire track surface is depressible to activate a button function. FIG. 20b shows track pad 300 with an upper track surface 304 and a single pick zone 306. The line 308 which separates track surface 304 from pick zone 306 can be created by a textured glass surface with LED side lighting, IR ink with LED side lighting, electro-luminescence, magnetic ink, two-tone rolling wire, or the like. FIG. 20c shows an alternate embodiment having two pick zones 310 and 312. These zones can be associated with separate button functions, for example "left click" and "right click." FIG. 20d shows two track zones that are left-biased, i.e., left pick zone 314 is larger than right pick zone 316. FIG. 20e shows two track zones that are right-biased, i.e. left pick zone 318 is smaller than right pick zone 320. FIG. 20f shows three pick zones 322. The delineation options shown in FIG. 20 are given by way of example, and not by way of limitation.

In one embodiment, track and pick zones can be user-selectable. For example, the user can turn off the delineation line(s), such that the track pad is like that shown in FIG. 20a corresponding to a track pad that can be picked anywhere on its track surface, which now functions similar to the embodiment shown in FIG. 7. If the user later desires a more traditional track pad having left and right pick zones, he can configure the track pad to appear as shown in FIG. 20c, with a corresponding change in functionality of the track pad.

As shown in FIG. 21, in addition to displaying delineation lines on the track pad, a track pad 324 with a glass (or otherwise transparent or semi-transparent) track surface 326 can even function as a full pixel display. In one embodiment, track surface 326 can be an active matrix display, for example using electronic paper/electronic ink, LCD, thin film transistor liquid crystal display (TFT-LCD), etc.

E Ink® is the trade mark for one type of electronic paper developed by E Ink Corporation of Cambridge, Mass. The principal components of E Ink® are millions of tiny microcapsules 327, about the diameter of a human hair. In one embodiment, shown in FIG. 22, each microcapsule contains positively charged white particles 328 and negatively charged black particles 330 suspended in a clear fluid 332. When a negative electric field 334 is applied, the white particles move to the top of the microcapsule to become visible to the reader. This makes the surface appear white at that spot. At the same time, an opposite electric field 336 pulls the black particles to the bottom of the microcapsules where they are hidden. By reversing this process, the black particles appear at the top of the capsule, which now makes the surface appear dark at that spot. The top 338 and/or bottom 340 electrodes are transparent so that a user can see the colored particles.

To form an E Ink® electronic display, the ink is printed onto a sheet of plastic film that is laminated to a layer of circuitry. The circuitry forms a pattern of pixels that can then be controlled by a display driver. These microcapsules are suspended in a liquid "carrier medium" allowing them to be printed using existing screen printing processes onto virtually any surface, including glass, plastic, fabric and even paper. An exemplary E Ink® display was unveiled in February 2004 by Polymer Vision Ltd. This display is an organics-based quarter VGA (QVGA) (i.e., 320×240 pixels) active matrix display with a diagonal of five inches, a resolution of 85 dpi and a bending radius of 2 cm. The display combined a 25 micron thick active-matrix back pane containing the polymer electronics-based pixel driving, with a 200 micron front plane of reflective E Ink®.

As discussed, a glass surface can be used as a track surface in some embodiments of the present invention. Ideally, such a glass surface should have a low coefficient of friction, should be clean with high clarity, should not readily pick up smudges, readily scratch, or be abrasive to skin, and finally should be mechanically robust in order to survive thousands of cycles of track pad depressions.

One disadvantage of conventional glass structures is that they do not have all of these attributes simultaneously, e.g., conventional glass may be very clear, but it has a high coefficient of friction. Low friction is important in track pads (e.g., track pads on laptop computers) because overcoming excessive frictional forces between the glass and a user's finger, for example, can cause user discomfort or could cause inadvertent picks in the case of a depressible track pad. The preferred glass surface is one that is silky-smooth and highly optically clear.

There are various known methods to treat glass including, for example, blasting, laser etching, honing, and chemical etching. These conventional methods are normally applied to a piece of raw glass. The surface of raw glass may appear smooth to the naked eye, but its smoothness actually increases the coefficient of friction because the finger (or other surface) is in direct contact with glass over a large percentage of surface area. To correct for this, treatments (etching, etc.) are sometimes applied to smooth surface 344 in order to decrease friction or change the optical properties of the glass. Etching glass produces microscopic bumps or peaks which reduces the smoothness of the raw glass; this lowers the coefficient of friction by reducing the surface area that a finger is in contact with the glass. In other words, a finger rubbed across a piece of etched glass will have to overcome frictional forces associated with directly contacting the bumps or peaks on the etched glass surface, but the finger will experience greatly reduced friction in areas between the bumps or peaks, which is essentially just air.

Producing a final piece of treated glass (e.g., for use in an LCD) is commonly been done in one step. For example, the raw glass is chemically etched. However, this single-step method does not yield a glass surface that has all of the desirable attributes mentioned above. For example, the glass surface may have lower friction, but is often associated with decreased clarity or decreased smudge resistance. Efforts to process the glass in multiple steps (e.g., mechanical abrasion followed by chemical post-processing) has also not been previously successful; the glass surfaces produced in multiple steps suffer the same disadvantages as those produced in a single step.

In the present invention, raw glass may be processed in a two step method to produce a much improved glass.

In the first step, a piece of raw glass 342 is processed mechanically or chemically to create a "seed surface" with a fine pitch. Tailoring the seed surface to have a very fine pitch (i.e., a very rough surface) would enable a subsequent liquid-polishing (i.e., in the second step) so as to produce a final glass surface having all of the desirable attributes. The seed surface is best seen in FIG. 24A where the processed glass has a bumpy surface 346 characterized by a peak-to-peak ratio 348 and an amplitude 350. This is the seed surface. A fine pitch seed surface, such as 346, will have a very low transmittance (ratio of transmitted to incident light), on the order of 30%.

The first step of processing the glass may be performed using chemical etching, for example using ammonium BiFlouride cream mixed with an inert carrier. This chemical etching cream is applied to the surface and left there for a period of time, for example 30 minutes. FIG. 24B shows the seed surface 346 at the conclusion of the first step. The seed surface is shown at 1,000 magnification. The scale at the bottom of FIG. 24B is scaled to 10 μm.

In the second step, the seed surface is exposed to a hydrofluoric acid (HF) solution incorporating a secondary acid. This is a wet application, meaning that HF could be sprayed onto the seed surface, or the seed surface could be dipped into HF. In one embodiment, the solution consists of HF and hydrocholoric acid, i.e., HF+HCl. In another embodiment, the solution consists of HF and sufluric acid, i.e., $HF+H_2SO_4$. In either of these embodiments, the acid solution may be mixed with water. The higher the concentration of HF the faster the process will occur, but the net result will be the same. In one embodiment, the solution may consist of approximately 5% HF with approximately 10% HCl and approximately 85% $H_2O$. The primary acid is HF, while the secondary acid (HCl or $H_2SO_4$) functions to remove residuals from the glass surface to let the HF react with the glass. The HF reacts with seed surface 346 produced during the first step and changes its topography, which in turn changes the relevant properties of the glass (e.g., transmittance, coefficient of friction). The resulting final glass surface 356 is shown in FIG. 25. Surface 356 has an amplitude 352 roughly equal to amplitude 350 of the seed surface, but a peak-to-peak ratio 354 that is roughly an order of magnitude larger (e.g., eight to twelve times) than the peak-to-peak ratio 348 of seed surface 346. Testing has shown that the amplitude is not significantly correlated to the relevant glass properties; the peak-to-peak ratio is the dominant characteristic. In other words, varying the amplitude of the final glass surface did not affect the relevant glass properties, while independently varying the peak-to-peak ratio drastically affected the relevant properties.

When seen from above, as in FIG. 26, which is magnified 1000 times, the final surface 356 has a matrix of divots 358, resembling a metal surface that has been randomly struck by a ball peen hammer. The resulting glass has all of the desirable attributes (low friction, clear, durability, smudge-resistant, etc. . . . ), and has an appearance that is "lively" and "sparkly." The transmittance of this glass is on the order of 90%.

The final surface 356 is a low friction surface. The coefficient of friction, t, of a surface is the ratio of a normal force, $F_N$, from an object on that surface to the frictional force, $F_F$, that must be overcome in order to move the object relative to the surface, i.e., $$\mu = \frac{F_N}{F_f}.$$

The frictional force is further classified into static and dynamic friction. Static friction, $F_S$, is the force that must be overcome when two objects are not moving relative to each other, while dynamic friction, $F_D$, is the frictional force between two objects in relative motion. Static friction is typically higher than dynamic friction, i.e., it normally takes a larger force to get an object moving relative to another surface when they were initially stationary, but a smaller force to keep the object in motion. The coefficients of static $\mu_S$ and dynamic $\mu_D$ friction are therefore defined as:

$$\mu_S = \frac{F_N}{F_S} \text{ and } \mu_D = \frac{F_N}{F_D}.$$

To demonstrate the frictional qualities of surfaces like final surface 356, a 1-inch diameter neoprene disk with a roughened surface using 320-grit sandpaper was loaded with a normal force and pulled along various samples of surfaces like 356. Tests were performed on various samples, and the neoprene disk was either pulled at 50 mm/min or 500 mm/min, and was loaded at either 71.4 grams or 295.9 grams. The surface was lubricated with squalene during some tests and not lubricated during the other tests. Table 1 summarizes the testing data:

FIG. 27 shows the peak-to-peak ratio produced in the second step of the glass treatment process as a function of time. The peak-to-peak ratio rapidly increases before a critical time Tcrit 360, at which point it proceeds basically asymptotically. This is important in manufacturing the glass because the process window of the second step is very large. In other words, the second step chemical treatment process is not time sensitive; the treatment can be applied and left on the glass for either a shorter time (near Tcrit 360) or for a much longer time to still get a relatively constant peak-to-peak ratio. This means that the time does not have to be carefully controlled; therefore, defective parts that would have needed to be scrapped if the peak-to-peak ratio were incorrect are reduced or eliminated. While the peak-to-peak ratio stays substantially constant in the asymptotic part of the peak-to-peak curve, the overall thickness of the glass is constantly decreasing during this process because the HF thins the glass.

In an alternate process, the first step can employ a mechanical treatment in lieu of the chemical treatment described above. For example, the glass can be treated with a fine grit (e.g., cerium oxide) and then mechanically honed. In some cases though, this may create micro fractures and/or give the final glass a lower four-point bending strength. As noted, the glass should be robust in order to survive thousands of pick cycles when used with a track pad; therefore, a chemical treatment, as described above, may be preferred to mechanical honing.

The two-step process of the present invention can be performed on a large sheet of glass, which is then subsequently cut into the desired shape, such as a rectangle. Alternatively, the raw glass can be cut into the desired shape first, and then treated. Cutting the glass into smaller shapes can introduce imperfections into the glass (e.g., small chips) which the chemical treatment can subsequently mask; therefore, in some embodiments it is desirable to cut the raw glass before treating it.

As shown in FIG. 28, PCB 110 can serve as the flexure hinge in an alternate embodiment. This has the advantage of

TABLE 1

Friction Data

| Sample | FN (grams) | Lubrication | Test 1 (grams) | Test 2 (grams) | Test 3 (grams) | $\mu_D$ | Standard deviation | $\mu_S/\mu_D$ | Standard deviation |
|---|---|---|---|---|---|---|---|---|---|
| 1 | 71.4 | Yes | 32.37 | 33.27 | 32.41 | 0.46 | 0.01 | 1.07 | 0.01 |
| 1 | 295.9 | Yes | 106.46 | 105.85 | 111.39 | 0.36 | 0.01 | 1.04 | 0.01 |
| 1 | 71.4 | Yes | 38.58 | 37.35 | 39.07 | 0.54 | 0.01 | 1.16 | 0.06 |
| 1 | 295.9 | Yes | 115.5 | 115.63 | 116.35 | 0.39 | 0.00 | 1.08 | 0.03 |
| 1 | 71.4 | No | 77.77 | 78.17 | 76.58 | 1.09 | 0.01 | 1.03 | 0.00 |
| 1 | 295.9 | No | 284.24 | 268.88 | 260.79 | 0.92 | 0.04 | | |
| 1 | 71.4 | No | 58.9 | 58.68 | 56.4 | 0.81 | 0.02 | 1.31 | 0.04 |
| 1 | 295.9 | No | 250.52 | 246.24 | 244.39 | 0.83 | 0.01 | 1.09 | 0.05 |
| 2 | 71.4 | Yes | 25.3 | 24.65 | 25.25 | 0.35 | 0.01 | 1.13 | 0.08 |
| 2 | 295.9 | Yes | 81.75 | 81.83 | 83.2 | 0.28 | 0.00 | 1.10 | 0.02 |
| 2 | 71.4 | Yes | 40.35 | 37.02 | 35.47 | 0.53 | 0.03 | 1.15 | 0.02 |
| 2 | 295.9 | Yes | 111.77 | 112.91 | 110.12 | 0.38 | 0.00 | 1.05 | 0.01 |
| 2 | 71.4 | No | 94.67 | 92.67 | 87.71 | 1.28 | 0.05 | 1.05 | 0.02 |
| 2 | 295.9 | No | n/a | n/a | n/a | n/a | n/a | n/a | n/a |
| 2 | 71.4 | No | 81.52 | 81.89 | 80.82 | 1.14 | 0.01 | 1.21 | 0.04 |
| 2 | 295.9 | No | 341.19 | 332.56 | 324.6 | 1.12 | 0.03 | 1.06 | 0.01 |
| 3 | 71.4 | Yes | 24 | 24.58 | 25.08 | 0.34 | 0.01 | 1.07 | 0.02 |
| 3 | 295.9 | Yes | 78.22 | 78.63 | 78.78 | 0.27 | 0.00 | 1.04 | 0.02 |
| 3 | 71.4 | Yes | 33.49 | 34.48 | 36.04 | 0.49 | 0.02 | 1.10 | 0.01 |
| 3 | 295.9 | Yes | 102.95 | 102.49 | 103.29 | 0.35 | 0.00 | 1.03 | 0.00 |
| 3 | 71.4 | No | 82.32 | 90.8 | 85.67 | 1.21 | 0.06 | 1.18 | 0.09 |
| 3 | 295.9 | No | n/a | n/a | n/a | n/a | n/a | n/a | n/a |
| 3 | 71.4 | No | 101 | 98.1 | 96.93 | 1.38 | 0.03 | 1.10 | 0.01 |
| 3 | 295.9 | No | 371.08 | 368.13 | 365.01 | 1.24 | 0.01 | 1.01 | 0.00 | requiring fewer parts. In this embodiment, track surface 102 and stiffener 114 surround PCB 110 except for a cantilevered portion 105 attached to computer frame 104. In this way, a gap 105*a* is formed which serves as the flexure hinge. When a user presses down on track surface 102, the track pad will pivot about 105*a* as cantilevered PCB 110 flexes in the area of 105*a*. When pressure from the user is relieved, PCB 110 will urge the track pad back to the neutral position, which in the illustrated embodiment is shown as horizontal. In another embodiment (not shown), gap 106 may be eliminated.

FIG. 29 shows another embodiment where a flexure hinge is made entirely from stiffener 114. In this embodiment, stiffener 114 has a cantilevered end 107 that is thinner than the main body of stiffener 114. End 107 is attached to computer frame 104 in an opening 109 in frame 104. When a user presses down on track surface 102, the track pad will pivot as end 107 flexes along gap 105*a*. When pressure from the user is relieved, end 107 of stiffener 114 will urge the track pad back to the neutral position, which in the illustrated embodiment is shown as horizontal.

FIG. 30 shows a flexure hinge made from a clad stiffener 123. Like clad stiffener 115 described above with reference to FIG. 9, clad stiffener 123 has, for example, and aluminum core 125 surrounded by an upper steel layer 127 and a lower steel layer 129. However, unlike clad stiffener 115, upper layer 127 has a cantilever extension 131 which is attached to computer frame 104 in an opening 109 in frame 104. When a user presses down on track surface 102, the track pad will pivot as extension 131 flexes along gap 105*a*. When pressure from the user is relieved, extension 131 will urge the track pad back to the neutral position, which in the illustrated embodiment is shown as horizontal. Instead of upper layer 127 having a cantilevered extension 131, core 125 or lower steel layer 129 may have a cantilever extension (not shown) to connect to frame 104 and act as a flexure hinge. Materials other than aluminum and steel may be used in a clad stiffener, provided they are stiff (i.e., high elastic modulus), thin, and are low density (i.e., lightweight).

Turning now to FIG. 31, another embodiment is shown in which stiffener 133 is unitary with computer frame 104. When a user presses down on track surface 102, the track pad will pivot as stiffener 133 flexes. When pressure from the user is relieved, stiffener 133 will urge the track pad back to the neutral position, which in the illustrated embodiment is shown as horizontal. In this embodiment, stiffener 133 and housing may be made of aluminum, for example.

Another input device 135 according to the present invention is shown in FIGS. 32 and 33. In this embodiment, input device 135 has a track surface 137, an electrode (or PCB) layer 139, and a stiffener 141. Stiffener 141 partially extends into a cavity 143 of computer frame 145. A trap 147 is attached to the underside of frame 145. Trap 147 has an X-Y alignment post 151 which extends into a notch 153 in stiffener 141. X-Y alignment post 151 fits inside of notch 153 and prevents stiffener 141 from moving in its own plane. Offset 155 extends along the front edge or pivot edge 157 of trap 147 and an area 159 between notch 153 and the maximum thickness of stiffener 141. When a user presses down on track surface 137, stiffener 141 rotates about pivot edge 157. The presence of offset 155 and stiffener thickness transition 159 enables one-way rotation downward of input device 135. One-way rotation is desirable to retain input device 135 inside of frame 145 and to keep track surface 137 flush to the outside of frame 145 in the nominal state as represented in FIG. 32.

As can be appreciated, all of the various flexure hinges described herein do not appreciably add to the thickness of the depressible track pads. Therefore, any of the flexure hinges of the present invention are particularly suitable for use in ultrathin applications (laptops, media devices, mobile phones, game players, etc.)

In the various track pads discussed above, inherent flexibility of various flexure hinges serves to urge the track pads back to their neutral positions whenever the user is not depressing the track pad to activate the button function. In other words, the track pads discussed above are biased to the neutral position by way of inherent flexibility. It is possible to use magnetic forces to bias a track pad to the neutral position. Magnetic force can be the sole biasing mechanism, or it can enhance existing biasing due to inherent flexibility. In other words, magnets can be used on any of the previously discussed input devices to supplement the bias provided from the various flexure hinges discussed.

In the various track pads discussed above, a mechanical dome switch serves as the primary restorative member to urge the track pads back to their neutral positions whenever the user is not depressing the track pad to activate the button function. Inherent flexibility in the various flexure hinges described above also urges the track pads back to their neutral positions. The mechanical dome is also responsible for providing tactile feedback to a user for a pick event. It is possible to use magnetic forces to bias a track pad to the neutral position and or to provide tactile feedback to the user. Magnetic force can be the sole biasing and tactile mechanism, or it can enhance existing biasing and tactile feel due to the mechanical dome switch and inherent flexibility from flexure hinges. In other words, magnets can be used on any of the previously discussed input devices to supplement the bias and tactile feel to the neutral position.

Turning to FIG. 34*a*, an input device 161 using magnetic forces is shown. Input device 161 has a track pad 163 having a track surface 165. Like the other track pads discussed herein, track pad 163 has a sensor arrangement to detect and process finger movements on track surface 165. For example, track pad 163 may employ capacitive sensing. To this end, track pad 163 has an electrode layer 167 (which may be on a PCB) for capacitive sensing. In the illustrated embodiment, track pad 163 has a pick zone 169 which is separated from track surface 165. In this case, a user moves his finger relative to track surface 165 in order to perform tracking operations (e.g., move a cursor) but depresses pick zone 169 in order to activate a button functionality.

Input device 161 is shown in the neutral position in FIG. 34*a*. Magnetic attractive forces between magnet 179 and flange 177 biases the pick zone 169 to the neutral position and allows for movement to an activate position (to activate a button function) whenever a user depresses pick zone 169. Button assembly 171 consists of a leveling plate 173, flexure attachment 175, flange 177 and pick zone 169. Leveling plate 173 is composed of a relatively stiff material, for example, steel, which is also optimally thin and lightweight. Leveling plate 173 is connected to track pad 163 by flexure attachment 175, which may be, for example, a thin piece of steel attached with screws. Flexure attachment 175 is capable of bending, similar to flexure hinge 122 discussed in relation to FIGS. 8, 10, and 12. In another implementation, flexure attachment 175 can be a pivot pin assembly. When depressed at pick zone 169, button assembly 171 hinges or pivots at flexure attachment 175 causing a movement sensor (not shown) to activate. The movement sensor may be capacitive, proximity, Hall-effect, optical, mechanical membrane or a plurality of sensors. Input device 161 is shown in the activate position in FIG. 34b.

Magnet 179 may be positioned anywhere, but in the illustrated embodiment, flange 177 is located on an end of leveling plate 173 and is situated directly below magnet 179 which is opposite the pivot point defined by flexure attachment 175. Flange 177 may be a ferrous metal or other material capable of being attracted magnetically. Magnet 179 may be, for example, a permanent magnet, or electromagnet. In the illustrated embodiment magnet 179 is fixedly connected to the housing (not shown) of input device 161. In another embodiment, 179 may be fixed to the housing (not shown) of an electronic device in which input device 161 is incorporated. In this case, magnet 179 would not move, but flange 177 would move with leveling plate 173 when the magnetic force attraction between magnet 179 and flange 177 is overcome by the user depressing pick zone 169. In another embodiment (not shown) the magnet may move with leveling plate 173 while the metal portion stays fixed; in other words, magnet 179 and flange 177 can be the reverse of what is shown in FIG. 34. In such an embodiment, flange 177 may be a separate component from or it may integral with the housing (not shown). The magnetic force between magnet 179 and flange 177 can be controlled to obtain the desired click feel, for example by using a stronger or weaker permanent magnet, by varying the size or separation of magnet 179 and or flange 177, or by using an adjustable electromagnet.

Although input device 161 is shown in FIG. 34 as having a track surface 165 that is separate from a pick zone 169, magnetic biasing can be used on a track pad having a depressible track surface, such as those described above. In other words, magnets can be used to bias depressible track pads to their neutral position. For example, magnets can be used with track pad 100 shown in FIG. 7, or with the various flexure hinges shown in FIGS. 28-32.

While this invention has been described in terms of several embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. An input device comprising:
   a frame;
   an input surface positioned within the frame and configured to detect a user touch and a location of the user touch on the input surface;
   a movement indicator coupled to the input surface configured to detect a depression of the input surface along an axis in response to a user touch; and
   an adjustable limiter coupled to the frame defining a selected distance of depression required for the movement indicator to detect the depression.

2. The input device of claim 1, wherein the input surface comprises a multi-touch input surface.

3. The input device of claim 1, wherein the movement indicator comprises a switch.

4. The input device of claim 3, wherein the adjustable limiter comprises a set screw positioned below the dome switch.

5. The input device of claim 1, further comprising a shoulder portion coupled to the frame configured to maintain a substantially flush relationship between the input surface and an external surface of a housing coupled to the frame in the absence of a depression of the input surface.

6. The input device of claim 1, wherein:
   the input surface is configured to send a first signal to an electronic device of the location of the user touch; and
   the movement indicator is configured to send a second signal to the electronic device upon a detected depression.

7. The input device of claim 1, wherein the first and second signals are sent substantially simultaneously.

8. The input device of claim 1, wherein the adjustable limiter may be periodically adjusted to selectably redefine the selected distance.

9. The input device of claim 1, wherein the input surface is configured pivot about a pivot point.

10. The input device of claim 9, wherein the movement indicator and adjustable limiter are positioned a selected distance from the pivot point.

11. The input device of claim 1, wherein the movement indicator comprises one of the group consisting of a force sensor, a proximity sensor, and a pressure sensor.

12. The input device of claim 1, the input surface comprising:
   a glass layer;
   an ink layer disposed below the glass layer; and
   a stiffener disposed below the ink layer.

13. The input device of claim 12, wherein the ink layer comprises an electronic ink layer.

14. The input device of claim 1, wherein the input surface further comprises a backlight.

15. An electronic device comprising:
   a housing comprising an aperture; and
   an input element positioned at least partially within the aperture comprising:
      a frame;
      an input surface positioned within the frame and configured to detect a user touch and a location of the user touch on the input surface;
      a movement indicator coupled to the input surface configured to detect a depression of the input surface along an axis in response to a user touch; and
      an adjustable limiter coupled to the frame defining a selected distance of depression required for the movement indicator to detect the depression;
   wherein the frame is coupled to an interior surface of the housing.

16. The electronic device of claim 15, wherein the input surface comprises a multi-touch input surface.

17. The electronic device of claim 15, wherein the movement indicator comprises one of the group consisting of a switch, a force sensor, a proximity sensor, and a pressure sensor.

18. The electronic device of claim 15, wherein the adjustable limiter comprises a set screw.

19. The electronic device of claim 15, further comprising a shoulder portion coupled to the frame configured to maintain a substantially flush relationship between the input surface and an external surface of the housing in the absence of a depression of the input surface.

20. The electronic device of claim 15, wherein:
   the input surface is configured to send a first signal to the electronic device of the location of the user touch; and
   the movement indicator is configured to send a second signal to the electronic device upon a detected depression;
   wherein the first and second signals are sent substantially simultaneously.

21. The electronic device of claim 15, the input surface comprising:
  a glass layer;
  an ink layer disposed below the glass layer; and
  a stiffener disposed below the ink layer.

22. The electronic device of claim 15, wherein the ink layer comprises an electronic ink layer.

23. The electronic device of claim 15, wherein the input surface further comprises a backlight.

\* \* \* \* \*